United States Patent
Kawamura

(10) Patent No.: US 9,628,714 B2
(45) Date of Patent: Apr. 18, 2017

(54) LENS APPARATUS AND IMAGE PICKUP APPARATUS INCLUDING THE SAME

(71) Applicant: CANON KABUSHIKI KAISHA, Tokyo (JP)

(72) Inventor: Jun Kawamura, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/138,836

(22) Filed: Dec. 23, 2013

(65) Prior Publication Data

US 2014/0184839 A1    Jul. 3, 2014

(30) Foreign Application Priority Data

Dec. 27, 2012 (JP) ................ 2012-284752

(51) Int. Cl.
*H04N 5/232* (2006.01)
*G02B 9/00* (2006.01)
(Continued)

(52) U.S. Cl.
CPC .......... *H04N 5/23287* (2013.01); *G02B 9/00* (2013.01); *G02B 27/646* (2013.01);
(Continued)

(58) Field of Classification Search
CPC .... G02B 15/173; G02B 27/646; G02B 15/14; G02B 13/18; G02B 9/00; G02B 9/14;
(Continued)

(56) References Cited

U.S. PATENT DOCUMENTS 5,168,403 A * 12/1992 Umeda ................ G02B 15/16
359/557
5,617,159 A    4/1997 Sakagami et al.
(Continued)

FOREIGN PATENT DOCUMENTS

CN      1690758 A    11/2005
CN    102455491 A    5/2012
(Continued)

OTHER PUBLICATIONS

European Search Report issued in European counterpart application No. EP13006024.7, dated Mar. 20, 2014.
(Continued)

*Primary Examiner* — Pascal M Bui-Pho
*Assistant Examiner* — Alberto Betancourt
(74) *Attorney, Agent, or Firm* — Rossi, Kimms & McDowell LLP

(57) ABSTRACT

A lens apparatus includes an optical system including multiple lens units, the optical system including: a first lens unit which is disposed closest to an object side in the optical system and is rotatable about a point in a vicinity of an optical axis of the optical system; and at least one lens unit which is movable in a direction including a component in a direction perpendicular to the optical axis. The following conditional expression is satisfied: $1.0 < ft/|f1| < 2.2$, where ft represents a focal length of the optical system at a telephoto end, and f1 represents a focal length of the first lens unit. At least one of rotation of the first lens unit or movement of the at least one lens unit in the direction including the component in the direction perpendicular to the optical axis changes an image formation position in the direction perpendicular to the optical axis.

6 Claims, 17 Drawing Sheets

(51) Int. Cl.
*H04N 5/225* (2006.01)
*G02B 27/64* (2006.01)
*G02B 15/163* (2006.01)
*G02B 13/00* (2006.01)

(52) U.S. Cl.
CPC ......... *H04N 5/2254* (2013.01); *G02B 13/009* (2013.01); *G02B 15/163* (2013.01); *G03B 2207/005* (2013.01); *H04N 5/2328* (2013.01); *H04N 5/23264* (2013.01)

(58) Field of Classification Search
CPC ... G02B 9/34; G02B 9/60; G02B 9/62; G02B 9/64; G02B 15/28; G02B 13/004; G02B 13/0045; G02B 27/64; G02B 27/642; G02B 7/16; G02B 7/10; G02B 15/00; G02B 7/04; G02B 23/06; G02B 13/12; G02B 17/0896; G02B 15/15; G02B 15/155; G02B 15/16; G02B 15/20; G02B 15/22; G02B 15/24; G02B 27/644; G02B 15/163; G02B 15/161; G02B 13/009; G02B 7/005; G02B 7/004; G02B 7/02; G02B 7/003; G02B 2217/005; G02B 2207/005; G02B 15/167; G02B 15/17; G02B 15/177; G02B 15/26; G02B 15/02; G02B 15/04; G02B 15/06; G02B 15/10; G02B 15/12; G02B 15/08; G02B 7/00; H04N 5/23287; H04N 5/23264; H04N 5/2328; H04N 5/2329; H04N 5/23251; H04N 5/23267; G03B 2205/0023; G03B 2207/0051; G01B 9/06; H01J 31/50
USPC ........ 359/683–687, 715, 740, 399–435, 354; 359/676, 554–557, 694; 348/208.99, 348/208.1–208.15
See application file for complete search history.

(56) References Cited

U.S. PATENT DOCUMENTS

| | | | | |
|---|---|---|---|---|
| 5,844,719 | A * | 12/1998 | Wada | G02B 27/646 359/557 |
| 7,525,729 | B2 * | 4/2009 | Suzaki | G02B 15/173 359/557 |
| 8,279,530 | B2 | 10/2012 | Peng et al. | |
| 8,605,363 | B2 | 12/2013 | Sakai et al. | |
| 2001/0046383 | A1 | 11/2001 | Hagimori et al. | |
| 2004/0227844 | A1 * | 11/2004 | Sakamoto | H04N 5/2254 348/357 |
| 2005/0237626 | A1 | 10/2005 | Park | |
| 2006/0215279 | A1 * | 9/2006 | Shibayama | G02B 15/173 359/690 |
| 2008/0123191 | A1 * | 5/2008 | Suzaki et al. | 359/555 |
| 2011/0032615 | A1 | 2/2011 | Usui et al. | |
| 2013/0050843 | A1 * | 2/2013 | Nakamura | G02B 15/173 359/684 |
| 2014/0029111 | A1 * | 1/2014 | Shibata | G02B 15/20 359/686 |

FOREIGN PATENT DOCUMENTS

| | | | |
|---|---|---|---|
| CN | 102621673 A | 8/2012 | |
| JP | 09-251127 A | 9/1997 | |
| JP | 2003-202499 A | 7/2003 | |
| JP | 2010204341 A | 9/2010 | |
| JP | WO 2012081603 A1 * | 6/2012 | ........... G02B 15/173 |

OTHER PUBLICATIONS

Office Action issued in CN201310718903.9, mailed Aug. 5, 2015. English translation provided.

* cited by examiner

LENS APPARATUS AND IMAGE PICKUP APPARATUS INCLUDING THE SAME

BACKGROUND OF THE INVENTION

Field of the Invention

The present invention relates to a lens apparatus having a image stabilization function, and more particularly, to a lens apparatus having a zooming function for a video camera, a silver-halide camera, a digital still camera, and the like, and to an image pickup apparatus including the lens apparatus.

Description of the Related Art

Heretofore, an image pickup apparatus such as a video camera is required to have an image stabilization function for preventing image blur due to a shake or the like, and various types of image stabilization methods are proposed. Among them, optical image stabilization, which has an image stabilization function by shifting a single lens or multiple lens units so as to have a component in a direction perpendicular to the optical axis, is widely used at present in a digital still camera, a video camera, and the like.

In addition, other than the above-mentioned image stabilization method, there are a method of rotating a part of an imaging lens about the center of curvature radius of the lens, and a method using a shiftable lens unit and a rotatable lens unit.

For instance, Japanese Patent Application Laid-Open No. H09-251127 discloses an optical system that rotates a part of an afocal unit or multiple lenses disposed on the most object side about the center of curvature radius for image stabilization. Japanese Patent Application Laid-Open No. 2003-202499 discloses an imaging lens including first to fourth lens units having positive, negative, positive and positive refractive powers, in which the second and third lens units are shiftable while the second, third, and fourth lens units are rotatable. The shiftable lenses and the rotatable lenses are moved for image stabilization.

However, the method of Japanese Patent Application Laid-Open No. H09-251127 has a problem in that optical performance is deteriorated when the image stabilization is performed because a rotation angle of the first lens unit is increased. In addition, the method of Japanese Patent Application Laid-Open No. 2003-202499 has a problem in that a light beam is vignetted so that a peripheral light amount ratio is decreased because the shift and the rotation are performed by two lens units in vicinity or in a rear side of an aperture stop.

In particular, when performing large image blur correction (hereinafter referred to as "large vibration isolation" in this specification) more than 50% of an angle of field at a telephoto end, an image blur correction amount is determined by a movement component in a direction perpendicular to the optical axis of a correction optical system. Therefore, because it is necessary to increase the movement component in the perpendicular direction for performing large vibration isolation, the deterioration of the optical performance and the decrease in peripheral light amount become conspicuous.

In addition, there is a method of rotating the lens unit itself so as to achieve both the optical performance and the peripheral light amount. However, a large actuator is necessary for driving the lens unit because the part to be moved has a large weight, which results in an increase of weight.

SUMMARY OF THE INVENTION

Therefore, the present invention provides a lens apparatus having high optical performance and a high peripheral light amount ratio in large vibration isolation and including a light-weight movable lens unit and a small entire optical system, and to provide an image pickup apparatus including the lens apparatus.

In order to achieve the above-mentioned object, according to one embodiment of the present invention, there is provided a lens apparatus, including an optical system including multiple lens units, the optical system including: a first lens unit which is disposed closest to an object side in the optical system and is rotatable about a point in a vicinity of an optical axis of the optical system; and at least one lens unit which is movable in a direction including a component in a direction perpendicular to the optical axis, in which the following conditional expression is satisfied:

$$1.0 < |ft/f1| < 2.2,$$

where ft represents a focal length of the optical system at a telephoto end, and f1 represents a focal length of the first lens unit, and in which at least one of rotation of the first lens unit or movement of the at least one lens unit in the direction including the component in the direction perpendicular to the optical axis changes an image formation position in the direction perpendicular to the optical axis.

According to the present invention, it is possible to provide the lens apparatus having high optical performance and a high peripheral light amount ratio in large vibration isolation, and including the light-weight movable lens unit and the small entire optical system, and to provide the image pickup apparatus including the lens apparatus.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Hereinafter, details of the present invention are described with reference to embodiments.

FIGS. 1A, 1B, 1C, 2A, 2B, and 2C illustrate cross-sectional views of an optical system of a lens apparatus according to Embodiment 1 of the present invention. The lens apparatus of this embodiment includes, in order from an object side, a first lens unit I having a positive refractive power, a second lens unit II having a negative refractive power, a stop (lens stop) S, a third lens unit III having a positive refractive power, and a fourth lens unit IV having a positive refractive power. In addition, the lens apparatus of this embodiment is a zooming optical system in which an interval between the first lens unit I and the second lens unit II, an interval between the second lens unit II and the third lens unit III, and an interval between the third lens unit III and the fourth lens unit IV are changed during zooming.

Figure 1A:
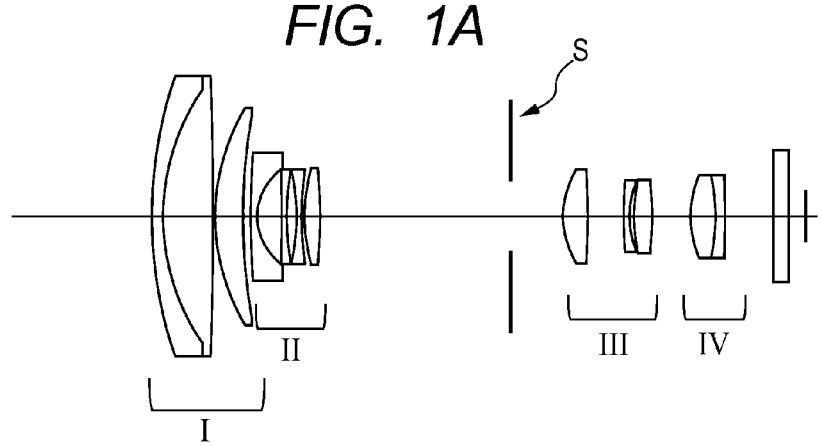
FIG. 1A is a cross-sectional view before vibration isolation at a wide angle end of a lens apparatus according to Embodiment 1 of the present invention.
Figure 1B:
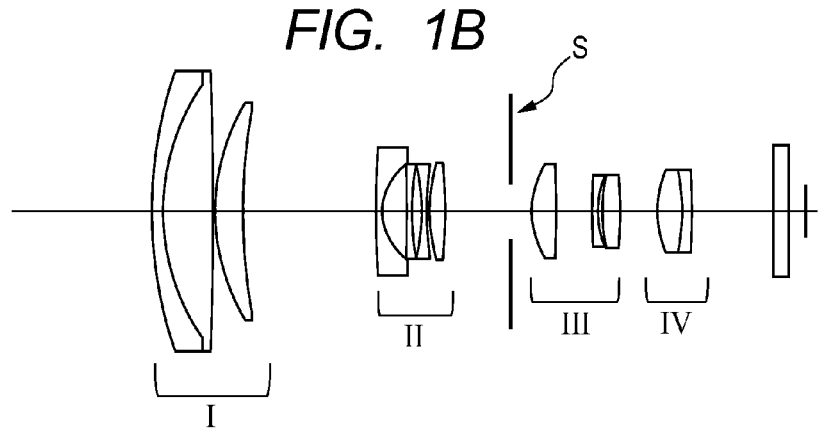
FIG. 1B is a cross-sectional view before vibration isolation at an intermediate focal length of the lens apparatus according to Embodiment 1 of the present invention.
Figure 1C:
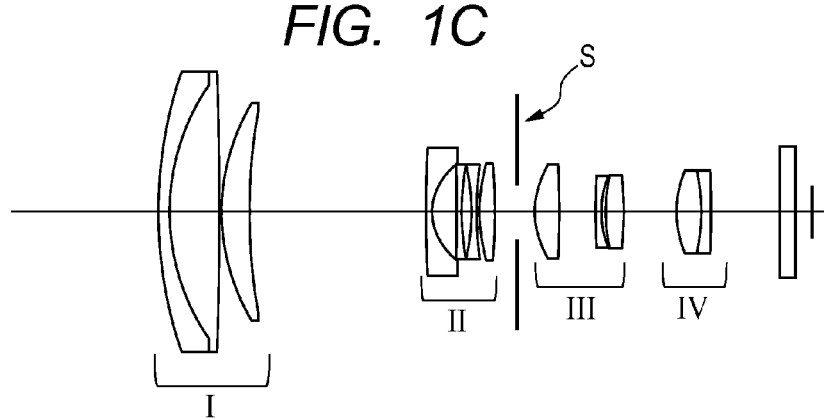
FIG. 1C is a cross-sectional view before vibration isolation at a telephoto end of the lens apparatus according to Embodiment 1 of the present invention.
Figure 2A:
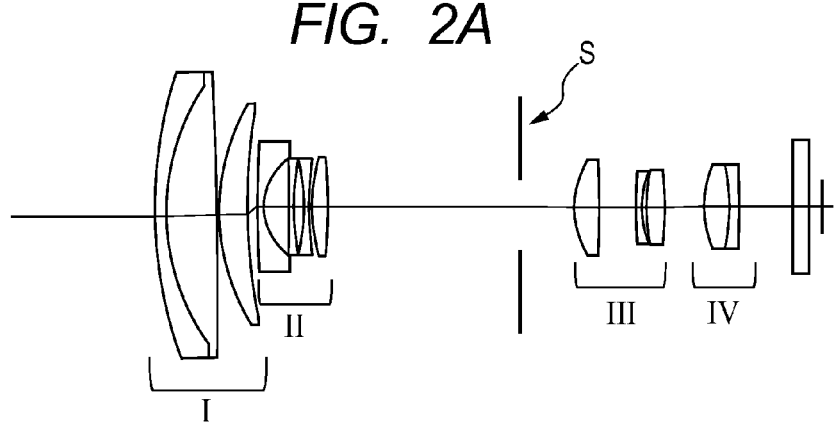
FIG. 2A is a cross-sectional view after vibration isolation at the wide angle end of the lens apparatus according to Embodiment 1 of the present invention.
Figure 2B:
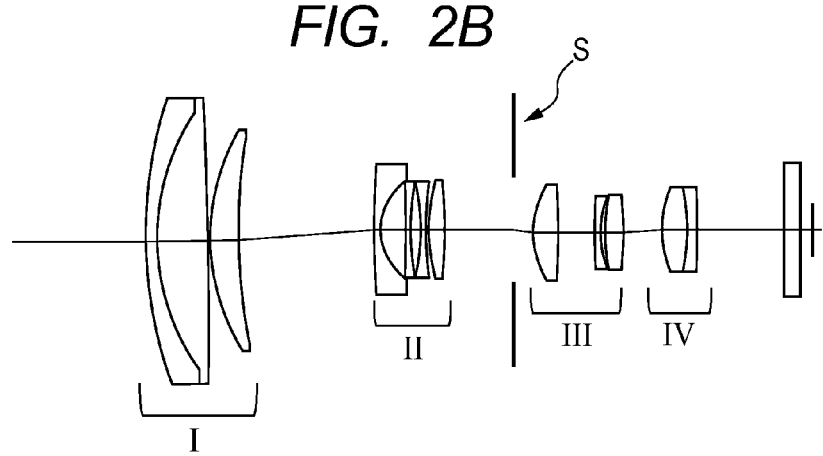
FIG. 2B is a cross-sectional view after vibration isolation at the intermediate focal length of the lens apparatus according to Embodiment 1 of the present invention.
Figure 2C:
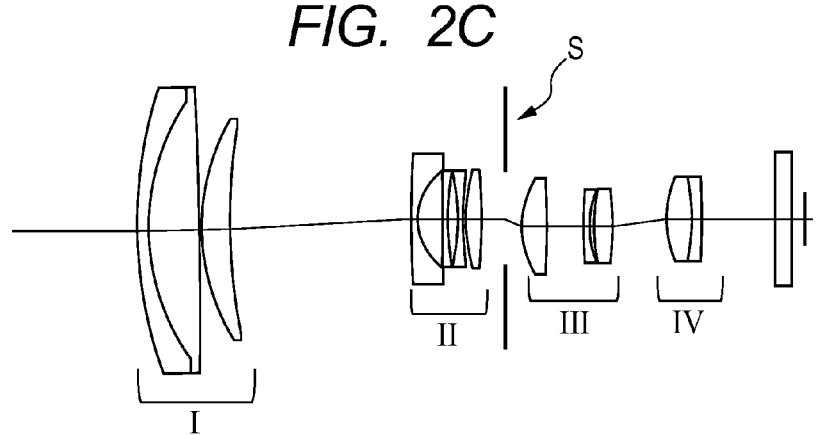
FIG. 2C is a cross-sectional view after vibration isolation at the telephoto end of the lens apparatus according to Embodiment 1 of the present invention.

FIGS. 1A, 1B, and 1C illustrate cross-sectional views before vibration isolation at a wide angle end, at an intermediate focal length, and at a telephoto end, respectively. FIGS. 2A, 2B, and 2C illustrate cross-sectional views after vibration isolation at the wide angle end, at the intermediate focal length, and at the telephoto end, respectively. Note that, "after vibration isolation" means a state where a predetermined optical system (an image stabilization lens) has moved in an operation (vibration isolation movement or image stabilization movement) of moving an image formation position, which fluctuated on an image plane in a direction perpendicular to an optical axis due to the fluctuation of an optical axis direction of the lens apparatus caused by vibration, by moving the image stabilization lens in a direction including a component in a direction perpendicular to the optical axis, so as to reduce fluctuation of a position of a subject image. In addition, "before vibration isolation" means a state where the image stabilization lens is not yet moved for the vibration isolation.

Figure 3A:
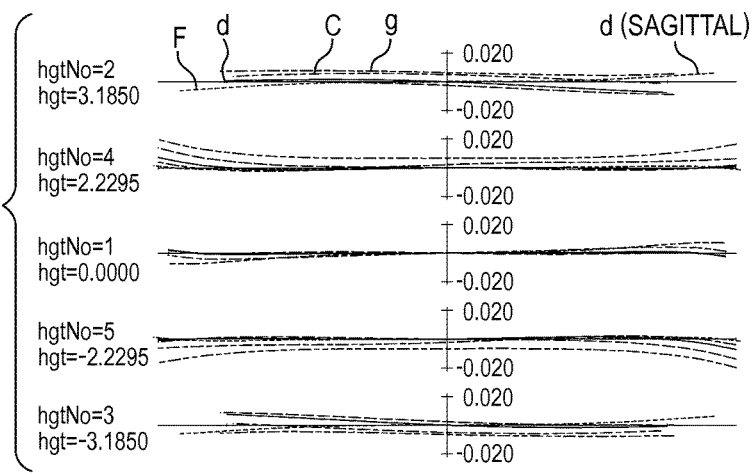
FIG. 3A is a lateral aberration diagram before vibration isolation at the wide angle end of the lens apparatus according to Embodiment 1 of the present invention.
Figure 3B:
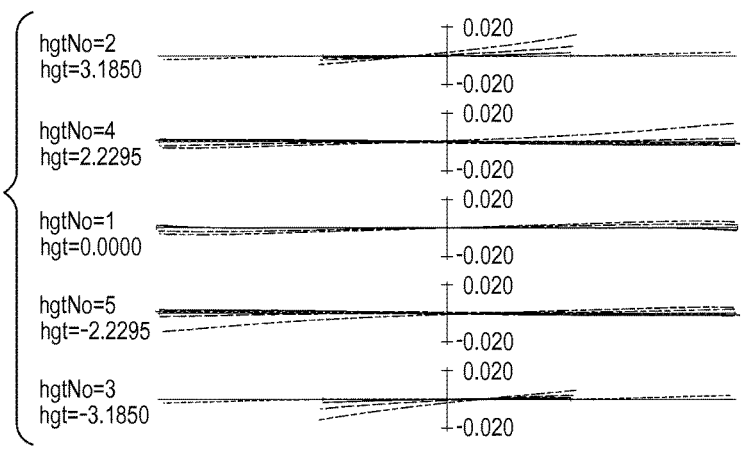
FIG. 3B is a lateral aberration diagram before vibration isolation at the intermediate focal length of the lens apparatus according to Embodiment 1 of the present invention.
Figure 3C:
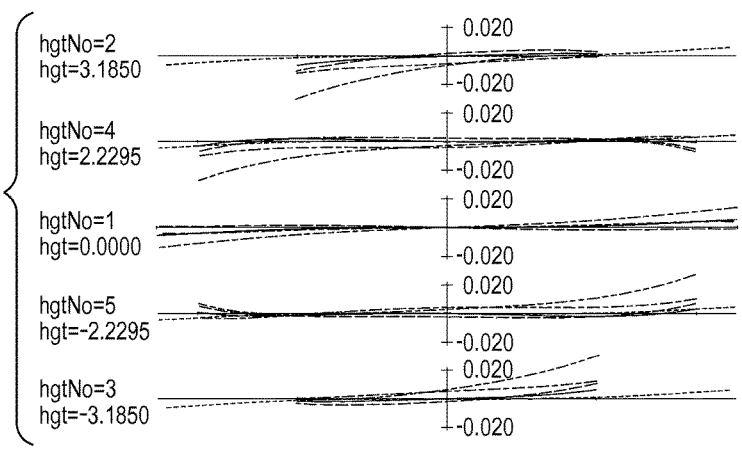
FIG. 3C is a lateral aberration diagram before vibration isolation at the telephoto end of the lens apparatus according to Embodiment 1 of the present invention.
Figure 4A:
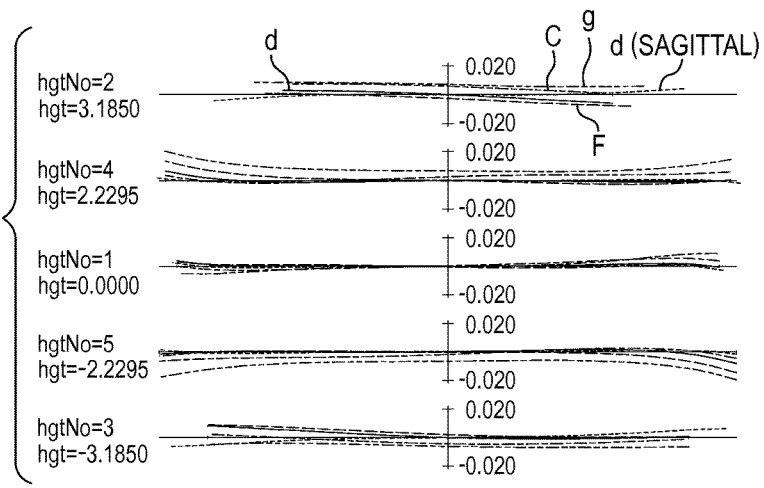
FIG. 4A is a lateral aberration diagram after vibration isolation at the wide angle end of the lens apparatus according to Embodiment 1 of the present invention.
Figure 4B:
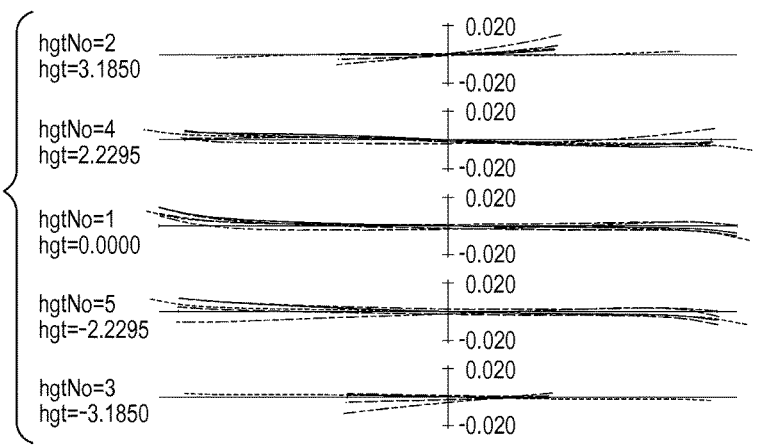
FIG. 4B is a lateral aberration diagram after vibration isolation at the intermediate focal length of the lens apparatus according to Embodiment 1 of the present invention.
Figure 4C:
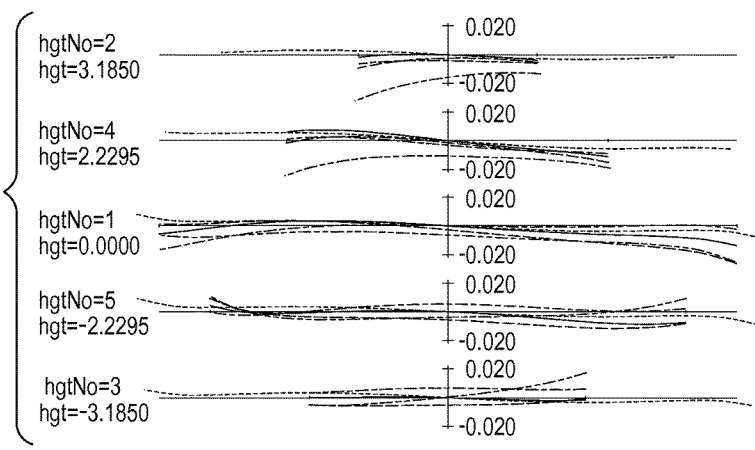
FIG. 4C is a lateral aberration diagram after vibration isolation at the telephoto end of the lens apparatus according to Embodiment 1 of the present invention.
Figure 5:
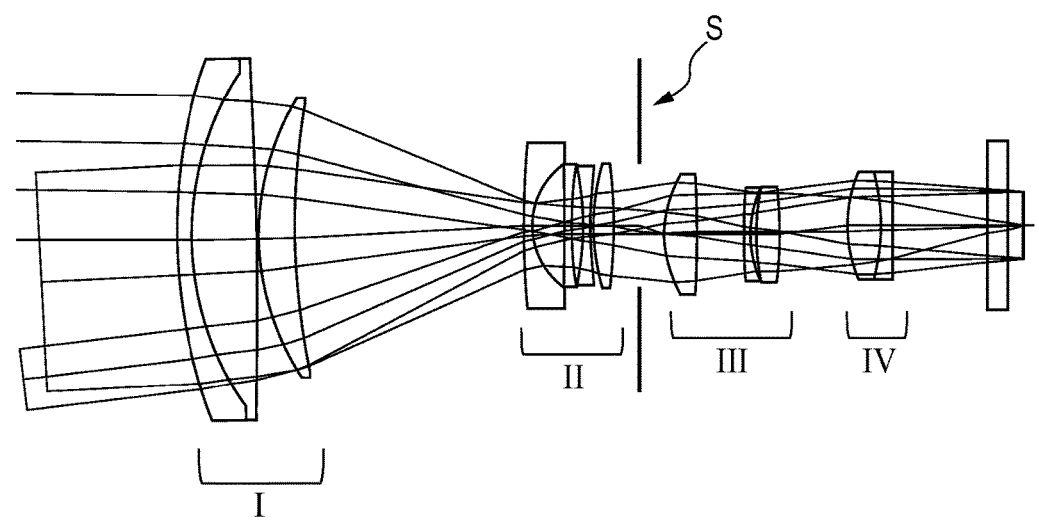
FIG. 5 is an optical path diagram after vibration isolation at the telephoto end of the lens apparatus according to Embodiment 1 of the present invention.

FIGS. 3A, 3B, and 3C illustrate lateral aberration diagrams before vibration isolation at the wide angle end, at the intermediate focal length, and at the telephoto end, respectively. FIGS. 4A, 4B, and 4C illustrate lateral aberration diagrams after vibration isolation at the wide angle end, at the intermediate focal length, and at the telephoto end, respectively. Here, image heights illustrated in the lateral aberration diagrams are, in order from the top, a maximum image height, an intermediate image height, on axis, the intermediate image height×(−1), and the maximum image height×(−1). In addition, FIG. 5 illustrates an optical path diagram after vibration isolation at the telephoto end. The light beams respectively enter at the maximum image height, on axis, and at the maximum image height×(−1). In the optical path diagrams and the cross-sectional views of the embodiments, a parallel flat plate disposed on an image side of the final lens unit is a glass block of a face plate or a low-pass filter of a CCD, and the line on the image side of the parallel flat plate is the image plane.

Table 1 shows a rotation center position and a rotation amount of the first lens unit, and a shift amount of the third lens unit when the vibration isolation is performed so as to change the optical axis direction by 3 degrees in Embodiment 1.

TABLE 1

Rotation center position, rotation angle, and shift amount in vibration isolation of lens apparatus according to Embodiment 1 of the present invention

|  | I | | |
| --- | --- | --- | --- |
|  | Rotation center position | Rotation angle | III Shift amount |
| Wide angle end | 43 | 97 | −0.13 |
| Intermediate focal length | 82 | 61 | −0.36 |
| Telephoto end | 80 | 60 | −0.84 |

Here, the rotation center position is a distance from a vertex of the first lens surface of the designated lens unit to the image plane on the optical axis, and a unit thereof is mm. In addition, a unit of the rotation angle is minute, and a unit of the shift amount is mm. Here, the sign is positive in a direction in which light travels in the optical axis direction and is positive in the upward direction on the paper of the lens cross-sectional view in a direction perpendicular to the optical axis. The sign of the lens rotation angle is positive in a counterclockwise direction in the lens cross-sectional view. The same is true in the following embodiments. Note that, each of the shift amounts described in the following embodiments is a shift amount in a case of shifting the lens units in a direction perpendicular to the optical axis. However, the present invention is not limited to this. A case of moving the lens units in a direction including a component in a direction perpendicular to the optical axis so as to change the image formation position in a direction perpendicular to the optical axis is also included in the scope of the present invention. In addition, the movement is preferably shift but is not limited to shift as long as the movement includes the component in a direction perpendicular to the optical axis.

In Embodiment 1, as shown in Table 1, the rotation center of the rotatable image stabilization lens unit (first lens unit) disposed closest to the object side is in the vicinity of the optical axis and is closer to the image side than the vertex of the first lens surface of the first lens unit (hereinafter referred to as a first unit rotational surface vertex) in the entire zoom range. A rotation center position in the optical axis direction is closest to the first unit rotational surface vertex at the wide angle end and moves toward the image side from the wide angle end to the intermediate focal length. The position is farthest from the first unit rotational surface vertex toward the image side at the intermediate focal length and moves again to be closer to the object side as being closer to the telephoto end.

Next, features of the present invention are described.

The present invention provides a lens apparatus that has high optical performance and high peripheral light amount ratio in large vibration isolation, and has a light-weight movable lens unit. For this purpose, it is necessary to achieve high optical performance and peripheral light amount ratio by necessary minimum drive without rotating the entire lens unit.

In the vibration isolation, the peripheral light amount ratio is deteriorated in a moving direction of the vibration isolation lens that shifts (moves in a direction including a component in a direction perpendicular to the optical axis) or rotates. In order to solve this problem, it is preferred to use a lens unit that does not deteriorate the peripheral light amount ratio as the image stabilization lens unit. The deterioration of the peripheral light amount ratio is caused when upper and lower lines of a light beam in a peripheral angle of field are apart from the optical axis due to the shift or rotation of the image stabilization lens unit and are vignetted. Therefore, it is preferred to select the image stabilization lens unit to be a lens unit that reduces the vignette of the light beam in the peripheral angle of field in the vibration isolation.

As illustrated in FIG. 5, rotating the first lens unit about a rotation center in the vicinity of the optical axis is advantageous for the lower line of the light beam having the maximum image height. However, if the large vibration isolation is performed only by rotating the first lens unit as the image stabilization lens unit, it is necessary to set a large rotation angle. As a result, coma or astigmatism due to decentering of the first lens unit remains so that optical performance is deteriorated. Therefore, in the present invention, in order to maintain good optical performance, lens units other than the first lens unit are moved so as to have a component in a direction perpendicular to the optical axis. Thus, the peripheral light amount ratio and the various aberrations (in particular, coma and astigmatism) generated in the entire zoom range are appropriately corrected. In this embodiment, the first lens unit is configured to be rotatable about a point on the optical axis, and the third lens unit is configured to be shiftable (movable) in a direction including a component in a direction perpendicular to the optical axis.

Conditional expression (1) defines a focal length ft of the entire lens system by an absolute value of a focal length f1 of the first lens unit used as the image stabilization lens unit, and indicates a range in which the vibration isolation method of the present invention is valid.

$$1.0 < ft/|f1| < 2.2 \qquad (1)$$

If ft/|f1| is 1.0 or smaller, a sufficient peripheral light amount ratio can be obtained even by moving lens units other than the first lens unit so as to have a component in a direction perpendicular to the optical axis. Therefore, the effect of using two or more image stabilization lens units is diluted. On the other hand, if ft/|f1| is 2.2 or larger, a peripheral image height light beam is vignetted by rotation of the first lens unit so that the peripheral light amount ratio is deteriorated. In addition, because coma and astigmatism at the telephoto end are simultaneously deteriorated, it is also difficult to sufficiently maintain optical performance.

The optical system of the present invention satisfies the conditional expression (1) so as to achieve high optical performance and peripheral light amount ratio even in large vibration isolation.

Note that, it is possible to appropriately correct the peripheral light amount ratio and various aberrations by moving one of image stabilization lens units so as to have a component in a direction perpendicular to the optical axis in a part of the zoom range (particularly on the wide angle side having a small shift amount of the image stabilization lens unit with respect to a vibration isolation angle). Therefore, in the part of the zoom range, one of the lens units enabling vibration isolation is not required to move.

Further, in the present invention, it is preferred to constitute the image stabilization lens unit other than the first lens unit (hereinafter referred to as a second image stabilization lens unit) to be shiftable to have a component in a direction perpendicular to the optical axis, to thereby perform the vibration isolation by shifting the second image stabilization lens unit along with rotation of the first lens unit. By shifting the second image stabilization lens unit so as to have a component in a direction perpendicular to the optical axis, it is possible to adopt a mechanism of an optical vibration isolation method that is generally used. Therefore, it is possible to realize the lens unit having a smaller size and a lighter weight.

Further, in the present invention, it is preferred to dispose the second image stabilization lens unit adjacent to the stop, or to dispose the stop between lenses (lens elements) in the second image stabilization lens unit. By disposing the second image stabilization lens unit adjacent to the stop or by constituting the second image stabilization lens unit to include the stop, the vibration isolation effect can be obtained with a minimum shift amount or rotation angle of this lens unit. In other words, it is possible to suppress a decrease of the peripheral light amount ratio in the vibration isolation.

Further, in the present invention, it is preferred that the first lens unit include at least one positive lens and at least one negative lens. When the first lens unit includes at least one positive lens and one negative lens, a good chromatic aberration correction effect can be obtained, and it is possible to achieve high optical performance.

Further, in the present invention, it is preferred that the rotation center of the rotatable image stabilization lens unit vary along with zooming. When the rotation center of the rotatable image stabilization lens unit varies along with the zooming, it is possible to keep balance between aberration due to a shift component in a direction perpendicular to the optical axis and aberration due to a tilt component. Therefore, it is possible to achieve good optical performance at each focal length of the lens apparatus.

Embodiment 2

Figure 6A:
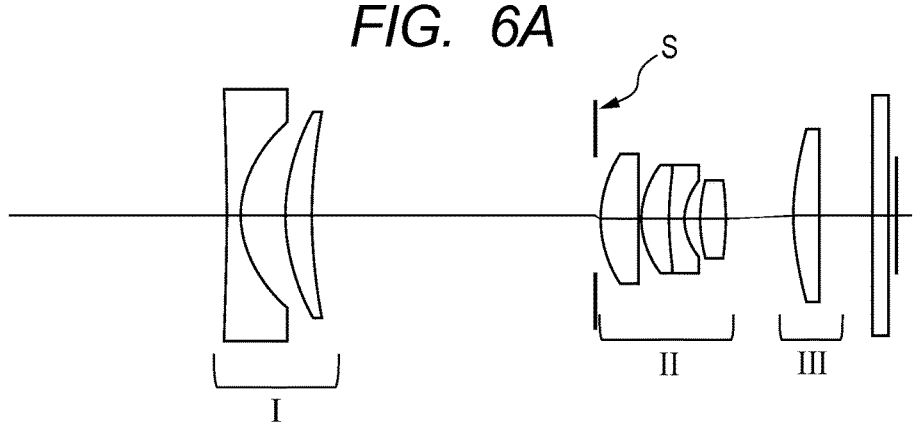
FIG. 6A is a cross-sectional view after vibration isolation at a wide angle end of a lens apparatus according to Embodiment 2 of the present.
Figure 6B:
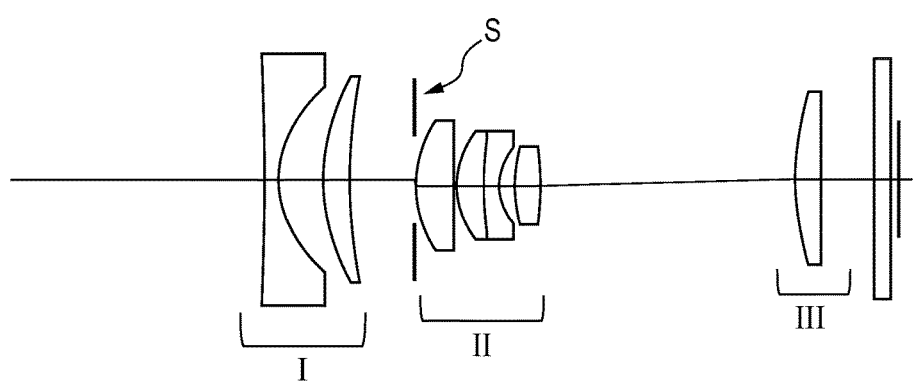
FIG. 6B is a cross-sectional view after vibration isolation at an intermediate focal length of the lens apparatus according to Embodiment 2 of the present invention.
Figure 6C:
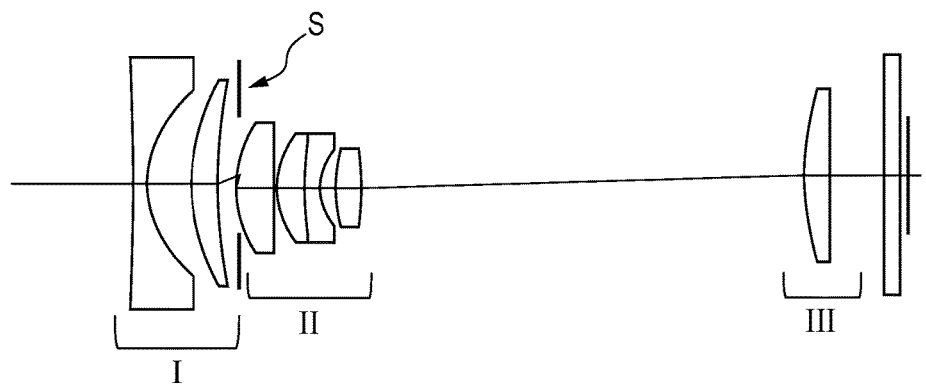
FIG. 6C is a cross-sectional view after vibration isolation at a telephoto end of the lens apparatus according to Embodiment 2 of the present invention.

FIGS. 6A, 6B, and 6C are cross-sectional views of a lens apparatus according to Embodiment 2 of the present invention and illustrate cross-sectional views after vibration isolation at the wide angle end (FIG. 6A), at the intermediate focal length (FIG. 6B), and at the telephoto end (FIG. 6C). The lens apparatus includes, in order from the object side, a first lens unit I having a negative refractive power, a stop (lens stop) S, a second lens unit II having a positive refractive power, and a third lens unit III having a positive refractive power. In addition, in the lens apparatus, an interval between the first lens unit I and the second lens unit II as well as an interval between the second lens unit II and the third lens unit III is changed during zooming.

Figure 7A:
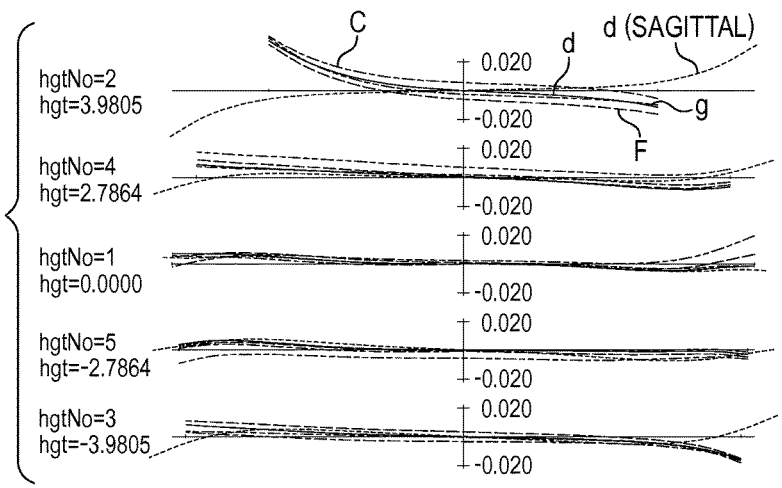
FIG. 7A is a lateral aberration diagram after vibration isolation at the wide angle end of the lens apparatus according to Embodiment 2 of the present invention.
Figure 7B:
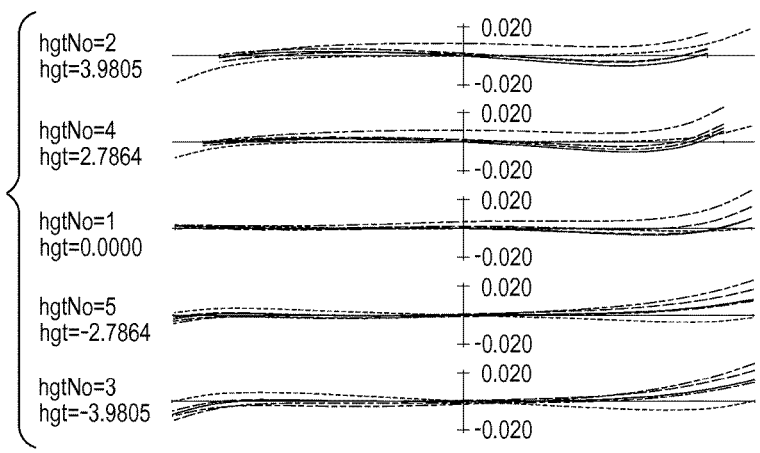
FIG. 7B is a lateral aberration diagram after vibration isolation at the intermediate focal length of the lens apparatus according to Embodiment 2 of the present invention.
Figure 7C:
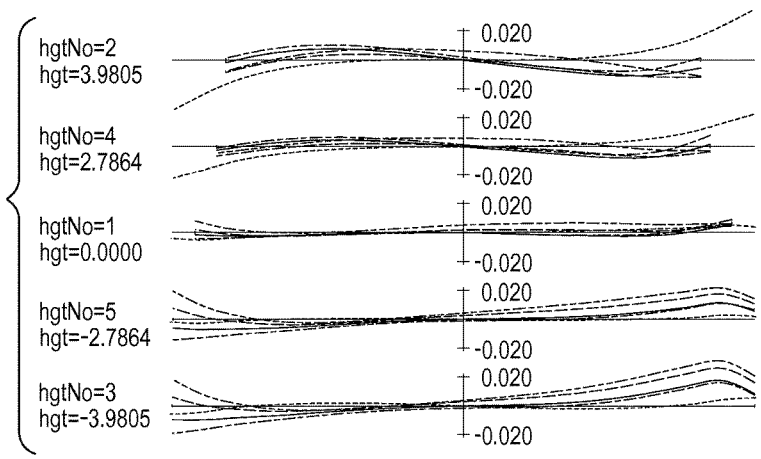
FIG. 7C is a lateral aberration diagram after vibration isolation at the telephoto end of the lens apparatus according to Embodiment 2 of the present invention.

FIGS. 7A, 7B, and 7C are lateral aberration diagrams illustrating performance of the lens apparatus of Embodiment 2 after vibration isolation. FIGS. 7A, 7B, and 7C illustrate lateral aberration diagrams after vibration isolation at the wide angle end, at the intermediate focal length, and at the telephoto end, respectively.

In this embodiment, the first lens unit is configured to be rotatable about a point on the optical axis, and the second lens unit is configured to be shiftable (movable) in a direction having a component in a direction perpendicular to the optical axis. Table 2 shows the rotation center position and the rotation amount of the first lens unit and the shift amount of the second lens unit when the vibration isolation is performed so as to change the optical axis direction of Embodiment 2 by 3 degrees.

TABLE 2

Rotation center position, rotation angle, and shift amount in vibration isolation of lens apparatus according to Embodiment 2 of the present invention

| | I | | II |
|---|---|---|---|
| | Rotation center position | Rotation angle | Shift amount |
| Wide angle end | −1.1 | 4.9 | −0.23 |
| Intermediate focal length | −1.5 | −21 | −0.40 |
| Telephoto end | −57 | −35 | −0.88 |

In Embodiment 2, as shown in Table 2, the rotation center position of the rotatable image stabilization lens unit (first lens unit) in the optical axis direction is changed by zooming, and is closer to the object side than the first unit rotational surface vertex in the entire zoom range. The rotation center position of the first lens unit in the optical axis direction is closest to the first unit rotational surface vertex at the wide angle end and is moved toward the object side from the wide angle end through the intermediate focal length to the telephoto end.

Embodiment 2 satisfies all the conditions and achieves high optical performance and peripheral light amount ratio at the wide angle end, at the intermediate focal length, and at the telephoto end even in large vibration isolation.

Embodiment 3

Figure 8A:
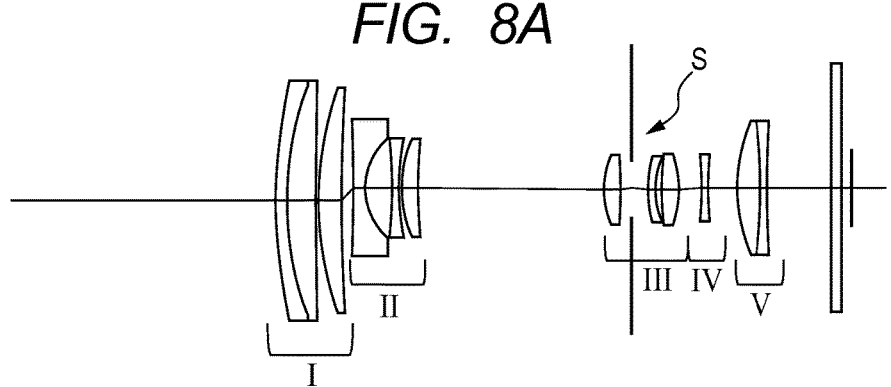
FIG. 8A is a cross-sectional view after vibration isolation at a wide angle end of a lens apparatus according to Embodiment 3 of the present invention.
Figure 8B:
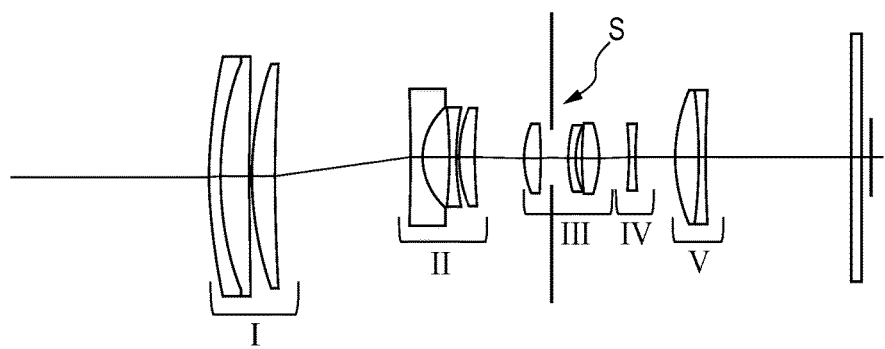
FIG. 8B is a cross-sectional view after vibration isolation at an intermediate focal length of the lens apparatus according to Embodiment 3 of the present invention.
Figure 8C:
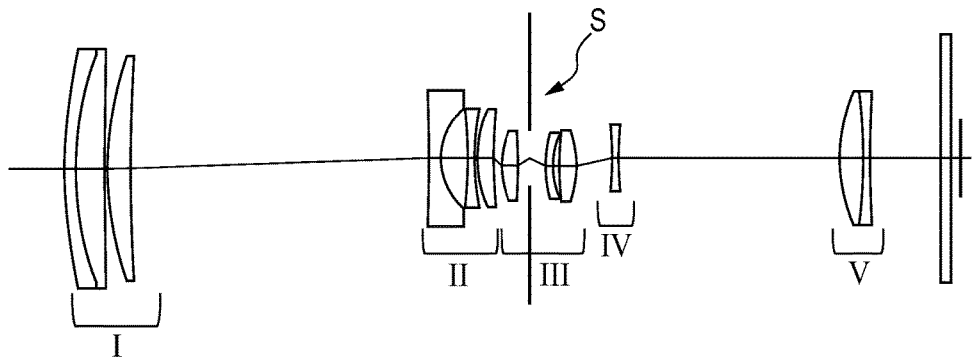
FIG. 8C is a cross-sectional view after vibration isolation at a telephoto end of the lens apparatus according to Embodiment 3 the present invention.

FIGS. 8A, 8B, and 8C are cross-sectional views of a lens apparatus according to Embodiment 3 of the present invention and illustrate cross-sectional views after vibration isolation at the wide angle end (FIG. 8A), at the intermediate focal length (FIG. 8B), and at the telephoto end (FIG. 8C). The lens apparatus includes, in order from the object side, a first lens unit I having a positive refractive power, a second lens unit II having a negative refractive power, a stop (lens stop) S, a third lens unit III having a positive refractive power, a fourth lens unit IV having a negative refractive power, and a fifth lens unit V having a positive refractive power. In addition, in the lens apparatus, an interval between the first lens unit I and the second lens unit II, an interval between the second lens unit II and the third lens unit III, an interval between the third lens unit III and the fourth lens unit IV, and an interval between the fourth lens unit IV and the fifth lens unit V are changed during zooming.

Figure 9A:
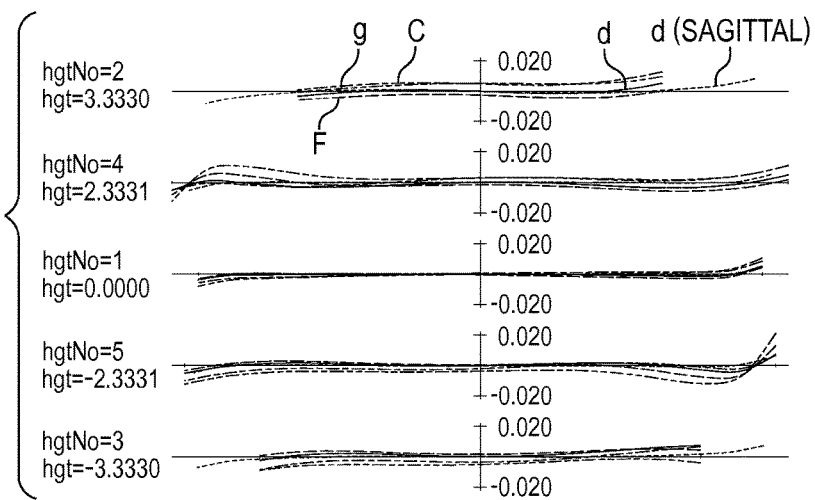
FIG. 9A is a lateral aberration diagram after vibration isolation at the wide angle end of the lens apparatus according to Embodiment 3 of the present invention.
Figure 9B:
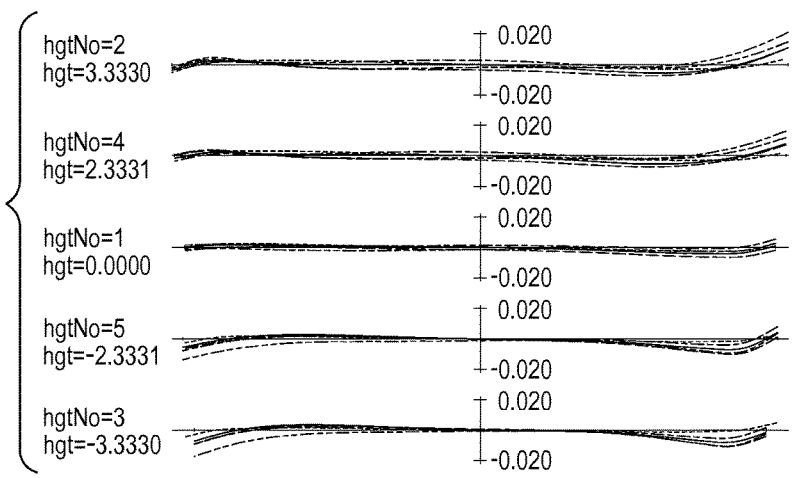
FIG. 9B is a lateral aberration diagram after vibration isolation at the intermediate focal length of the lens apparatus according to Embodiment 3 of the present invention.
Figure 9C:
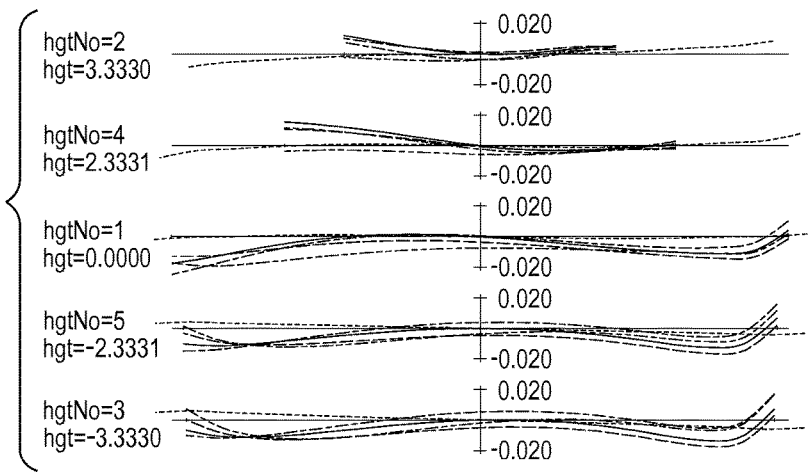
FIG. 9C is a lateral aberration diagram after vibration isolation at the telephoto end of the lens apparatus according to Embodiment 3 of the present invention.

FIGS. 9A, 9B, and 9C are lateral aberration diagrams illustrating optical performance of the lens apparatus of Embodiment 3 after vibration isolation at the wide angle end (FIG. 9A), at the intermediate focal length (FIG. 9B), and at the telephoto end (FIG. 9C).

In this embodiment, the first lens unit is configured to be rotatable about a point on the optical axis, and the third lens unit is configured to be shiftable (movable) in a direction having a component in a direction perpendicular to the optical axis. Table 3 shows the rotation center position and the rotation amount of the first lens unit and the shift amount of the third lens unit when the vibration isolation is performed so as to change the optical axis direction of Embodiment 3 by 3 degrees.

TABLE 3

Rotation center position, rotation angle, and shift amount in vibration isolation of lens apparatus according to Embodiment 3 of the present invention

| | I | | |
|---|---|---|---|
| | Rotation center position | Rotation angle | III Shift amount |
| Wide angle end | 88 | 40 | −0.09 |
| Intermediate focal length | 87 | 66 | −0.10 |
| Telephoto end | 94 | 34 | −0.67 |

In Embodiment 3, as shown in Table 3, the rotation center position of the rotatable image stabilization lens unit (first lens unit) in the optical axis direction is changed by zooming, and is closer to the image side than the first unit rotational surface vertex in the entire zoom range. The rotation center position of the first lens unit in the optical axis direction is closest to the first unit rotational surface vertex at the wide angle end and is moved toward the image side from the wide angle end through the intermediate focal length to the telephoto end.

Embodiment 3 satisfies all the conditions and achieves high optical performance and peripheral light amount ratio at the wide angle end, at the intermediate focal length, and at the telephoto end even in large vibration isolation.

Embodiment 4

Figure 10A:
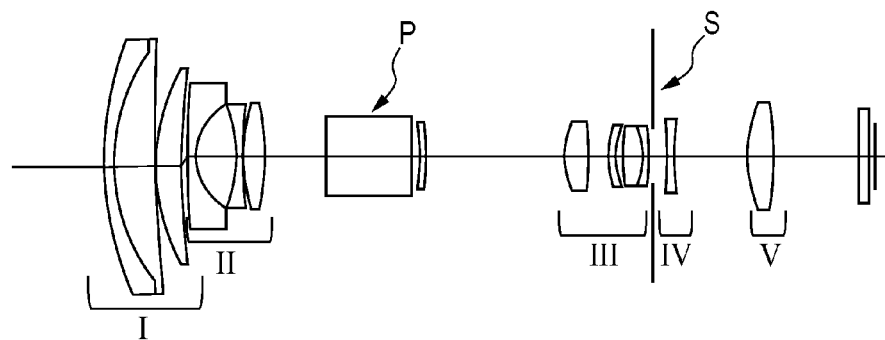
FIG. 10A is a cross-sectional view after vibration isolation at a wide angle end of a lens apparatus according to Embodiment 4 of the present invention.
Figure 10B:
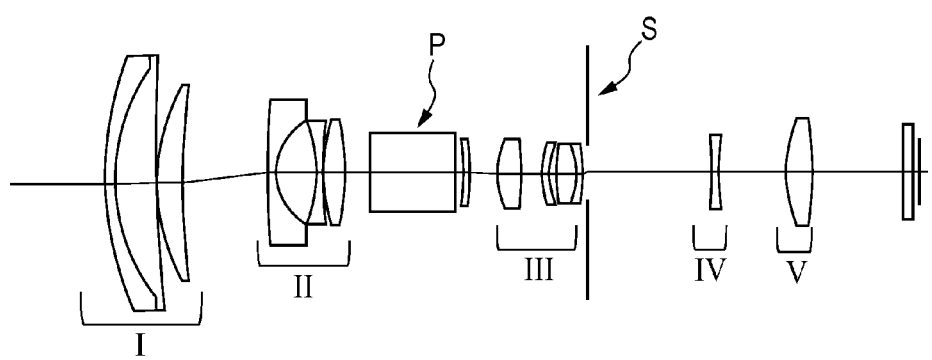
FIG. 10B is a cross-sectional view after vibration isolation at an intermediate focal length of the lens apparatus according to Embodiment 4 of to the present invention.
Figure 10C:
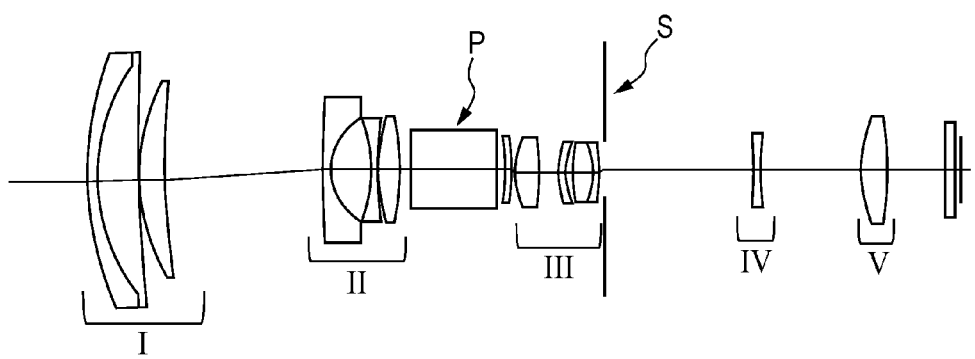
FIG. 10C is a cross-sectional view after vibration isolation at a telephoto end of the lens apparatus according to Embodiment 4 of the present invention.

FIGS. 10A, 10B, and 10C are cross-sectional views of a lens apparatus according to Embodiment 4 of the present invention and illustrate cross-sectional views after vibration isolation at the wide angle end (FIG. 10A), at the intermediate focal length (FIG. 10B), and at the telephoto end (FIG. 10C). The lens apparatus includes, in order from the object side, a first lens unit I having a positive refractive power, a second lens unit II having a negative refractive power, a prism P, a third lens unit III having a positive refractive power, a stop (lens stop) S, a fourth lens unit IV having a negative refractive power, and a fifth lens unit V having a positive refractive power. In addition, the lens apparatus is a zooming optical system in which an interval between the first lens unit I and the second lens unit II, an interval between the second lens unit II and the third lens unit III, an interval between the third lens unit III and the fourth lens unit IV, and an interval between the fourth lens unit IV and the fifth lens unit V are changed during zooming.

Figure 11A:
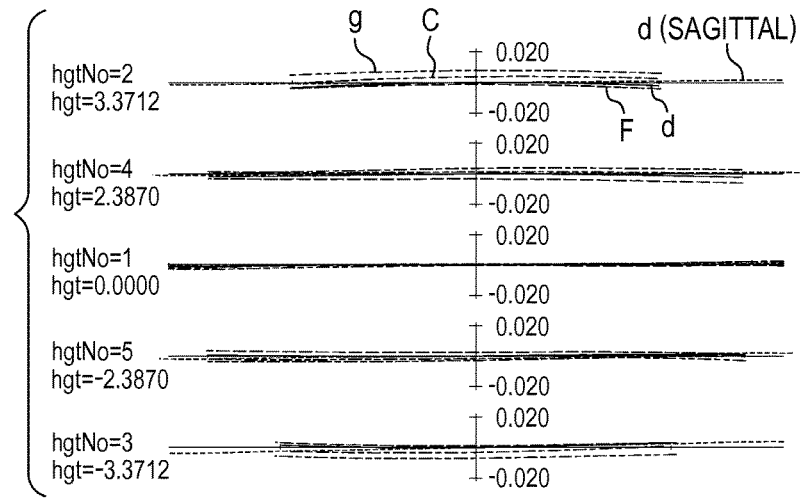
FIG. 11A is a lateral aberration diagram after vibration isolation at the wide angle end of the lens apparatus according to Embodiment 4 of the present invention.
Figure 11B:
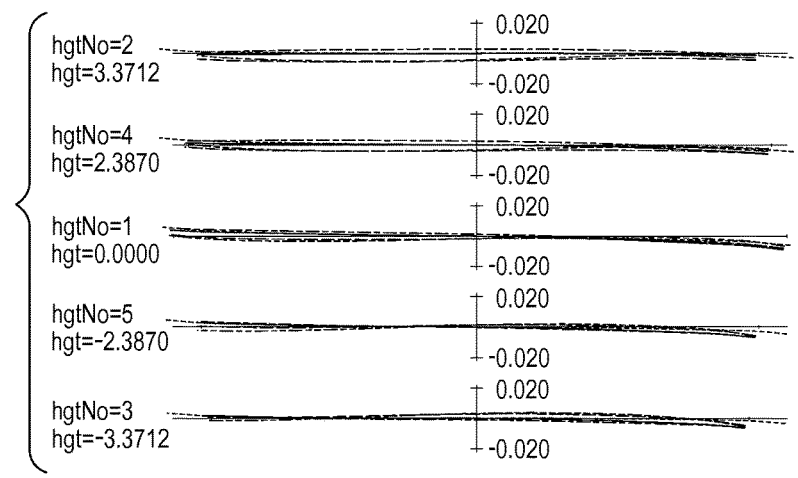
FIG. 11B is a lateral aberration diagram after vibration isolation at the intermediate focal length of the lens apparatus according to Embodiment 4 of the present invention.
Figure 11C:
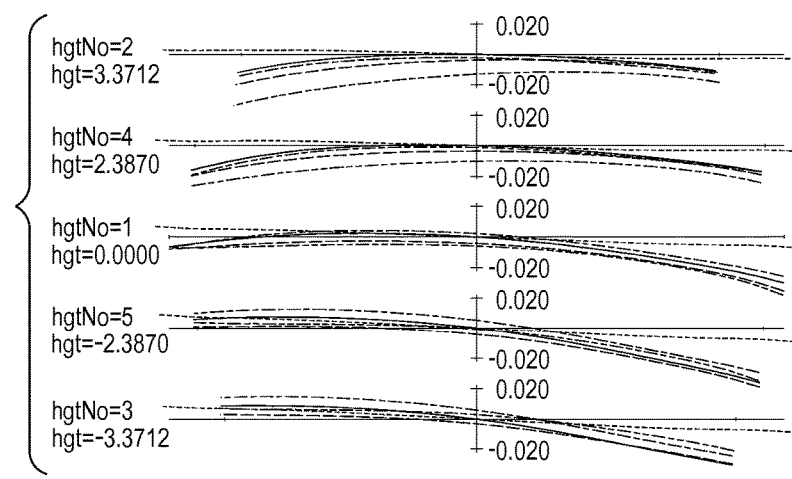
FIG. 11C is a lateral aberration diagram after vibration isolation at the telephoto end of the lens apparatus according to Embodiment 4 of the present invention.

FIGS. 11A, 11B, and 11C are lateral aberration diagrams illustrating optical performance of the lens apparatus of Embodiment 4 after vibration isolation at the wide angle end (FIG. 11A), at the intermediate focal length (FIG. 11B), and at the telephoto end (FIG. 11C).

In this embodiment, the first lens unit is configured to be rotatable about a point on the optical axis, and the third lens unit is configured to be shiftable (movable) in a direction having a component in a direction perpendicular to the optical axis. Table 4 shows the rotation center position in the optical axis direction and the rotation amount of the first lens unit and the shift amount of the third lens unit when the vibration isolation is performed so as to change the optical axis direction of Embodiment 4 by 3 degrees.

TABLE 4

Rotation center position in optical axis direction, rotation angle, and shift amount in vibration isolation of lens apparatus according to Embodiment 4 of the present invention

| | I | | |
|---|---|---|---|
| | Rotation center position | Rotation angle | III Shift amount |
| Wide angle end | 56 | 68 | −0.064 |
| Intermediate focal length | 89 | 45 | −0.14 |
| Telephoto end | 157 | 26 | −0.27 |

In Embodiment 4, as shown in Table 4, the rotation center position of the rotatable image stabilization lens unit (first lens unit) in the optical axis direction is changed by zooming, and is closer to the image side than the first unit rotational surface vertex in the entire zoom range. The rotation center position of the first lens unit in the optical axis direction is closest to the first unit rotational surface vertex at the wide angle end and is moved toward the image side from the wide angle end through the intermediate focal length to the telephoto end.

Embodiment 4 satisfies all the conditions and achieves high optical performance and peripheral light amount ratio at the wide angle end, at the intermediate focal length, and at the telephoto end even in large vibration isolation.

Embodiment 5

Figure 12A:
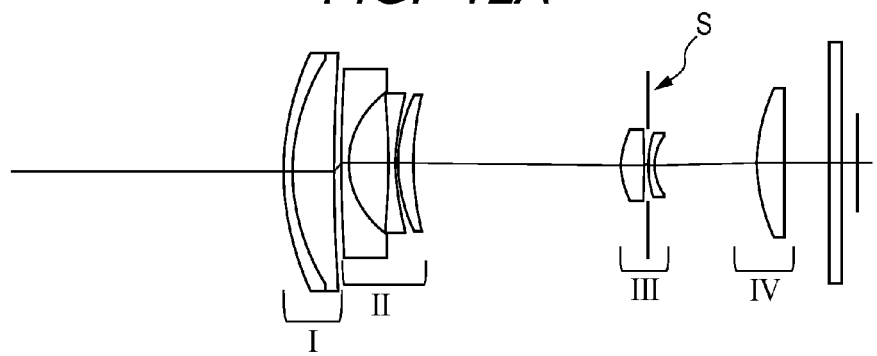
FIG. 12A is a cross-sectional view after vibration isolation at a wide angle end of a lens apparatus according to Embodiment 5 of the present invention.
Figure 12B:
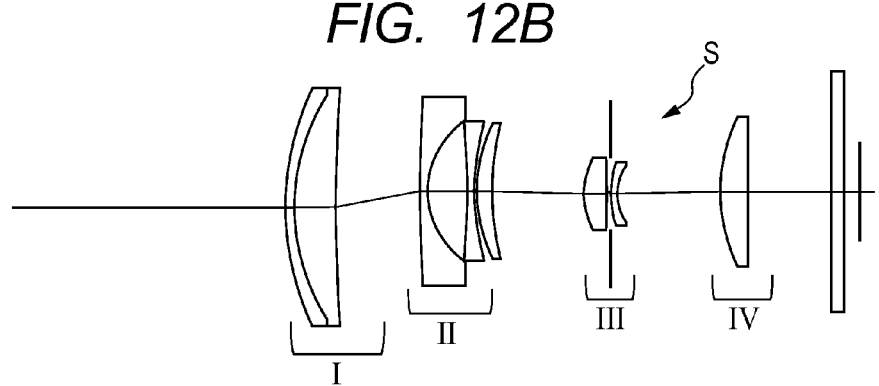
FIG. 12B is a cross-sectional view after vibration isolation at an intermediate focal length of the lens apparatus according to Embodiment 5 of the present invention.
Figure 12C:
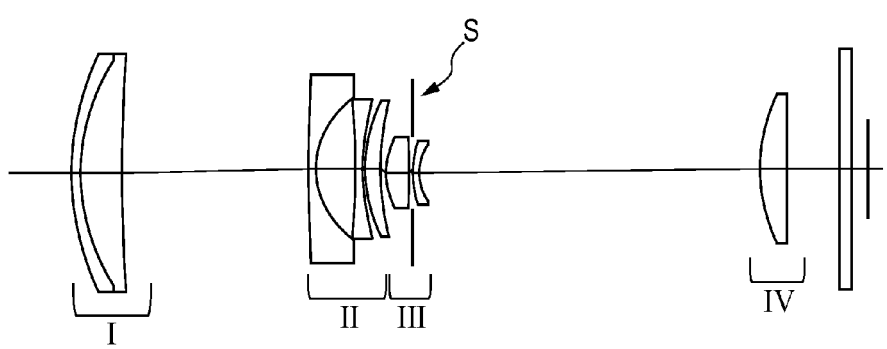
FIG. 12C is a cross-sectional view after vibration isolation at a telephoto end of the lens apparatus according to Embodiment 5 of the present invention.

FIGS. 12A, 12B, and 12C are cross-sectional views of a lens apparatus according to Embodiment 5 of the present invention and illustrate cross-sectional views after vibration isolation at the wide angle end (FIG. 12A), at the intermediate focal length (FIG. 12B), and at the telephoto end (FIG. 12C). The optical system of the lens apparatus illustrated in FIGS. 12A, 12B, and 12C includes, in order from the object side, a first lens unit I having a positive refractive power, a second lens unit II having a negative refractive power, a stop (lens stop) S, a third lens unit III having a positive refractive power, and a fourth lens unit IV having a negative refractive power. In addition, the lens apparatus is a zooming optical system in which an interval between the first lens unit I and the second lens unit II, an interval between the second lens unit II and the third lens unit III, and an interval between the third lens unit III and the fourth lens unit IV are changed during zooming.

Figure 13A:
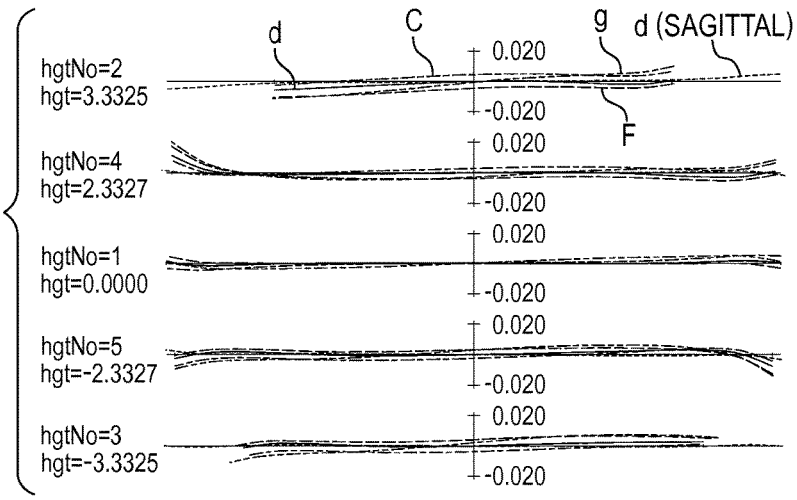
FIG. 13A is a lateral aberration diagram after vibration isolation at the wide angle end of the lens apparatus according to Embodiment 5 of the present invention.
Figure 13B:
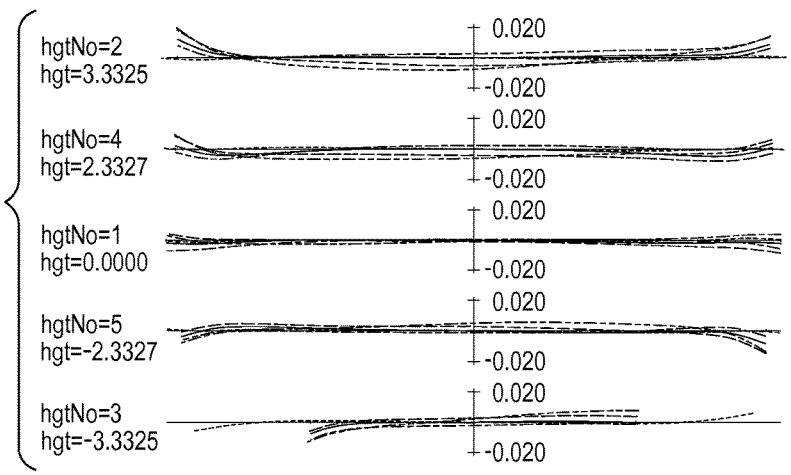
FIG. 13B is a lateral aberration diagram after vibration isolation at the intermediate focal length of the lens apparatus according to Embodiment 5 of the present invention.
Figure 13C:
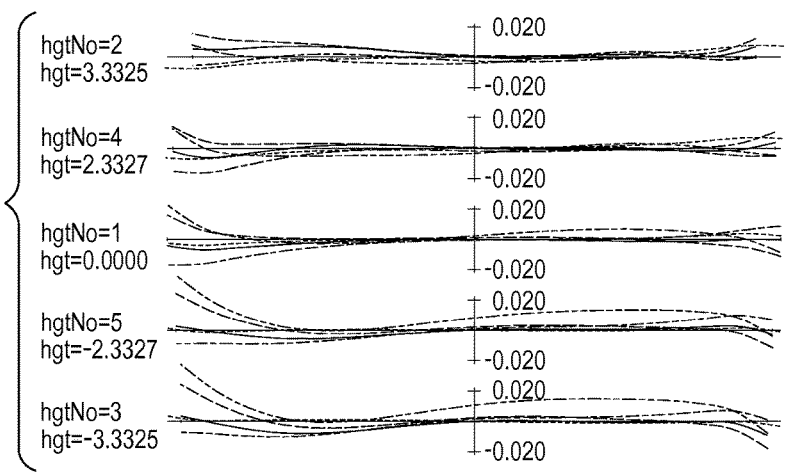
FIG. 13C is a lateral aberration diagram after vibration isolation at the telephoto end of the lens apparatus according to Embodiment 5 of the present invention.

FIGS. 13A, 13B, and 13C are lateral aberration diagrams illustrating optical performance of the lens apparatus of Embodiment 5 after vibration isolation at the wide angle end (FIG. 13A), at the intermediate focal length (FIG. 13B), and at the telephoto end (FIG. 13C).

In this embodiment, the first lens unit is configured to be rotatable about a point on the optical axis, and the third lens unit is configured to be shiftable (movable) in a direction having a component in a direction perpendicular to the optical axis. Table 5 shows the rotation center position in the optical axis direction and the rotation amount of the first lens unit and the shift amount of the third lens unit when the vibration isolation is performed so as to change the optical axis direction of Embodiment 5 by 3 degrees.

TABLE 5

Rotation center position in optical axis direction, rotation angle, and shift amount in vibration isolation of lens apparatus according to Embodiment 5 of the present invention

| | I | | III |
|---|---|---|---|
| | Rotation center position | Rotation angle | Shift amount |
| Wide angle end | 36 | 59 | −0.14 |
| Intermediate focal length | 56 | 66 | −0.14 |
| Telephoto end | −106 | −8.9 | −0.26 |

In Embodiment 5, as shown in Table 5, the rotation center position of the rotatable image stabilization lens unit (first lens unit) in the optical axis direction is changed by zooming. The rotation center position of the first lens unit in the optical axis direction in each zoom range is closer to the image side than the first unit rotational surface vertex at the wide angle end and at the intermediate focal length, and is closer to the object side than the first unit rotational surface vertex at the telephoto end. The rotation center position in the optical axis direction is moved toward the image side from the wide angle end to the intermediate focal length, and is moved toward the object side from the intermediate focal length to the telephoto end.

Embodiment 5 satisfies all the conditions and achieves high optical performance and peripheral light amount ratio at the wide angle end, at the intermediate focal length, and at the telephoto end even in large vibration isolation.

Embodiment 6

Figure 14A:
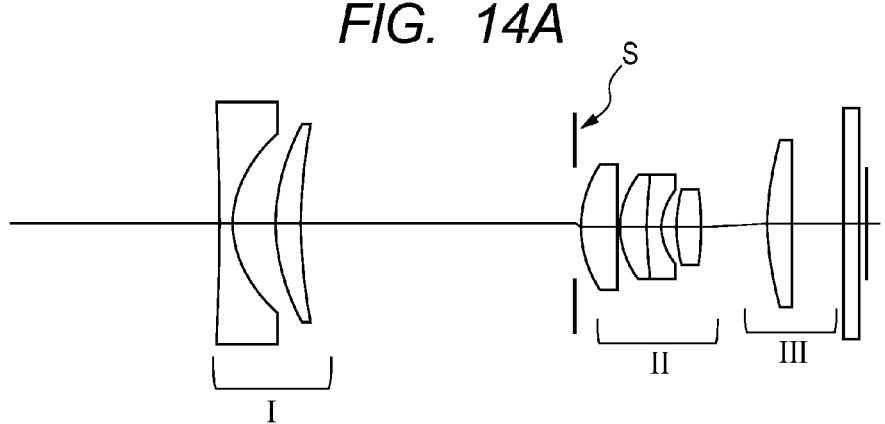
FIG. 14A is a cross-sectional view after vibration isolation at a wide angle end of a lens apparatus according to Embodiment 6 of the present invention.
Figure 14B:
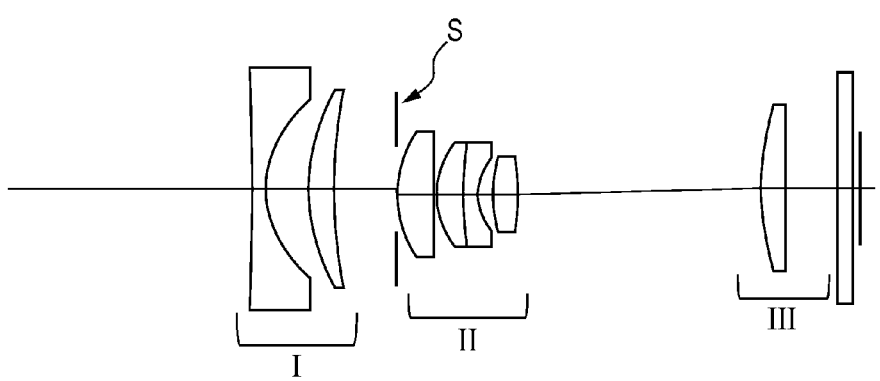
FIG. 14B is a cross-sectional view after vibration isolation at an intermediate focal length of the lens apparatus according to Embodiment 6 of the present invention.
Figure 14C:
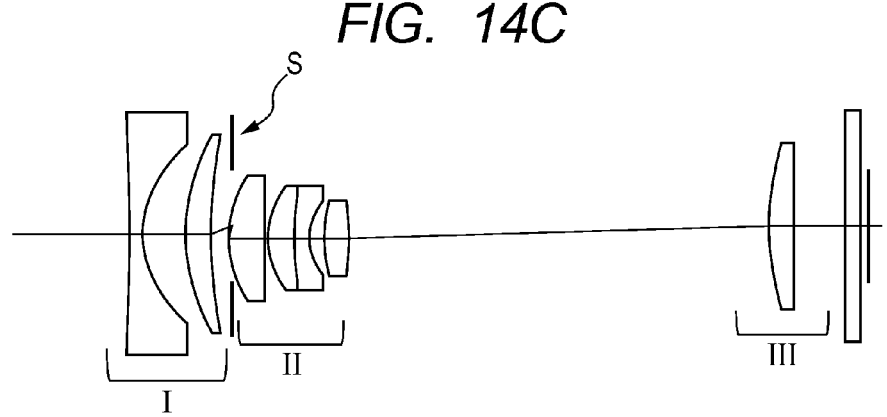
FIG. 14C is a cross-sectional view after vibration isolation at a telephoto end of the lens apparatus according to Embodiment 6 of the present invention.

FIGS. 14A, 14B, and 14C are cross-sectional views of a lens apparatus according to Embodiment 6 of the present invention and illustrate cross-sectional views after vibration isolation at the wide angle end (FIG. 4A), at the intermediate focal length (FIG. 14B), and at the telephoto end (FIG. 14C). The optical system of FIGS. 14A, 14B, and 14C includes, in order from the object side, a first lens unit I having a negative refractive power, a second lens unit II having a positive refractive power, a stop (lens stop) S, and a third lens unit III having a positive refractive power. In addition, the lens apparatus is a zooming optical system in which an interval between the first lens unit I and the second lens unit II as well as an interval between the second lens unit II and the third lens unit III is changed during zooming.

Figure 15A:
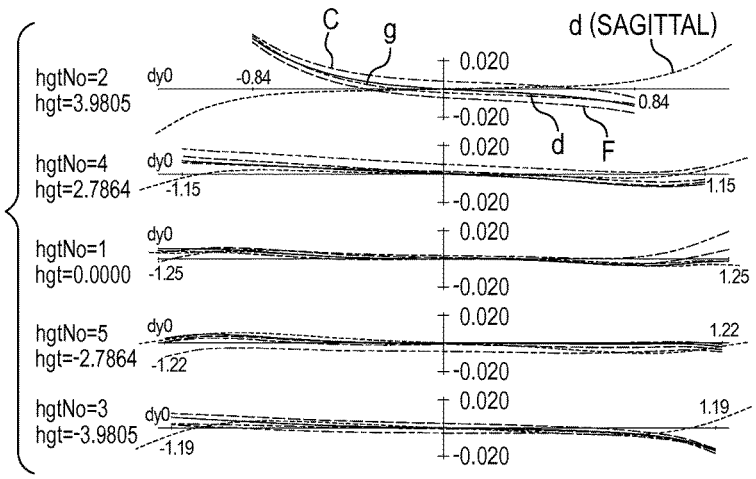
FIG. 15A is a lateral aberration diagram after vibration isolation at the wide angle end of the lens apparatus according to Embodiment 6 of the present invention.
Figure 15B:
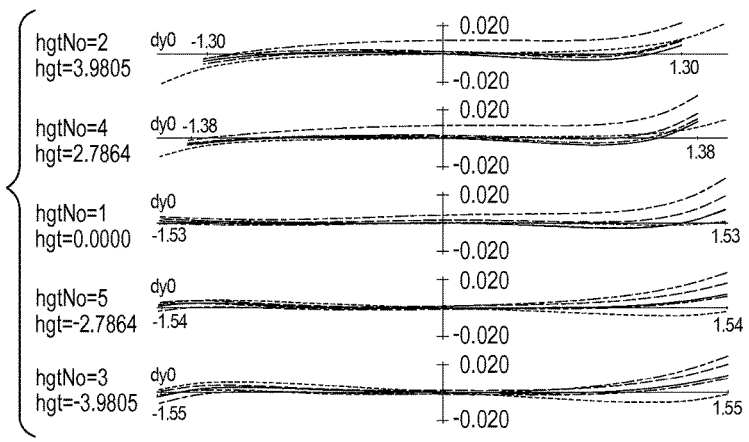
FIG. 15B is a lateral aberration diagram after vibration isolation at the intermediate focal length of the lens apparatus according to Embodiment 6 of the present invention.
Figure 15C:
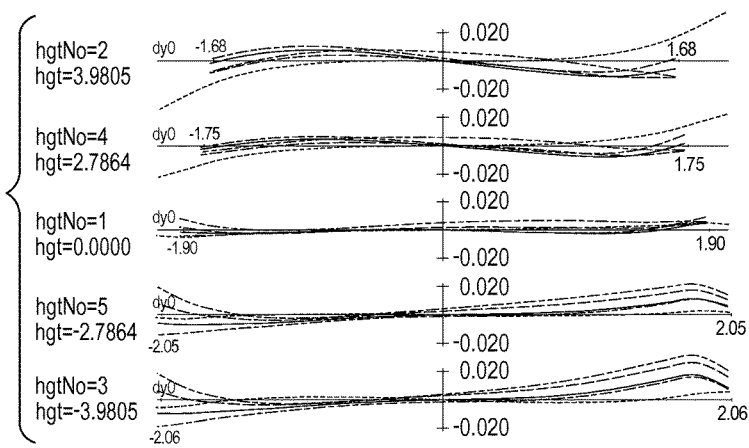
FIG. 15C is a lateral aberration diagram after vibration isolation at the telephoto end of the lens apparatus according to Embodiment 6 of the present invention.

FIGS. 15A, 15B, and 15C are lateral aberration diagrams illustrating optical performance of the lens apparatus of Embodiment 6 after vibration isolation at the wide angle end (FIG. 15A), at the intermediate focal length (FIG. 15B), and at the telephoto end (FIG. 15C).

In this embodiment, the first lens unit is configured to be rotatable about a point on the optical axis, and the second lens unit is configured to be shiftable (movable) in a direction having a component in a direction perpendicular to the optical axis. Table 6 shows the rotation center position in the optical axis direction and the rotation amount of the first lens unit and the shift amount of the second lens unit when the vibration isolation is performed so as to change the optical axis direction of Embodiment 6 by 3 degrees.

TABLE 6

Rotation center position in optical axis direction, rotation angle, and shift amount in vibration isolation of lens apparatus according to Embodiment 6 of the present invention

| | I | | II |
|---|---|---|---|
| | Rotation center position | Rotation angle | Shift amount |
| Wide angle end | −57 | 0.09 | −0.22 |
| Intermediate focal length | −57 | −0.55 | −0.40 |
| Telephoto end | −57 | −35 | −0.88 |

The lens itself of Embodiment 6 is the same as that used in Embodiment 2. However, the rotation center position of the first lens unit I is constant as −57 mm at every focal length. Because the lens of Embodiment 6 has a low magnification of five times from the wide angle end to the telephoto end, a shift amount of the peripheral light beam from the optical axis is small even after large vibration isolation is performed. Therefore, it is possible to achieve high optical performance and peripheral light amount ratio in the zoom range from the wide angle end to the telephoto end while maintaining a constant rotation center position.

Embodiment 7

Figure 16A:
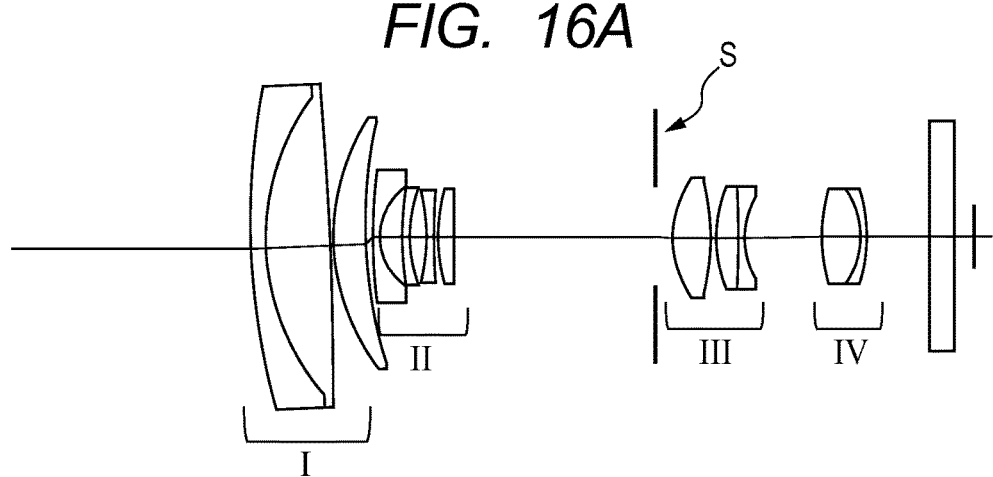
FIG. 16A is a lateral aberration diagram after vibration isolation at a wide angle end of a lens apparatus according to Embodiment 7 of the present invention.
Figure 16B:
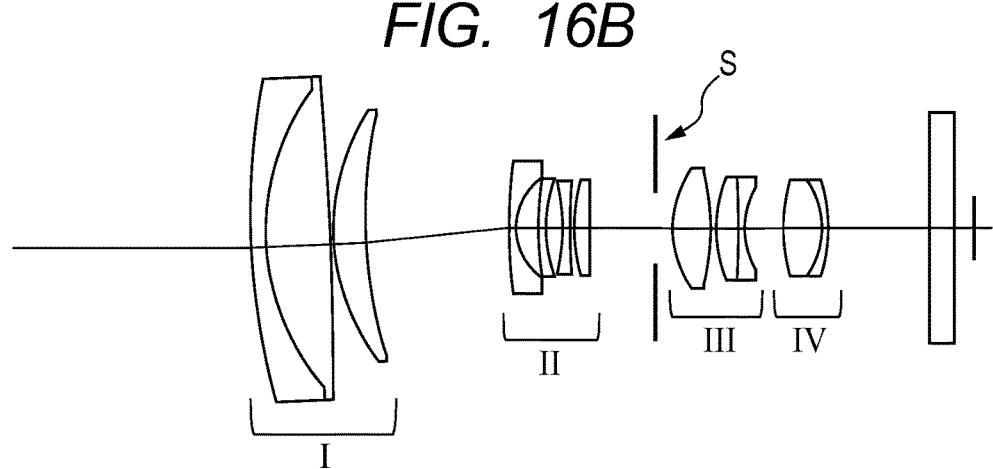
FIG. 16B is a lateral aberration diagram after vibration isolation at an intermediate focal length of the lens apparatus according to Embodiment 7 of the present invention.
Figure 16C:
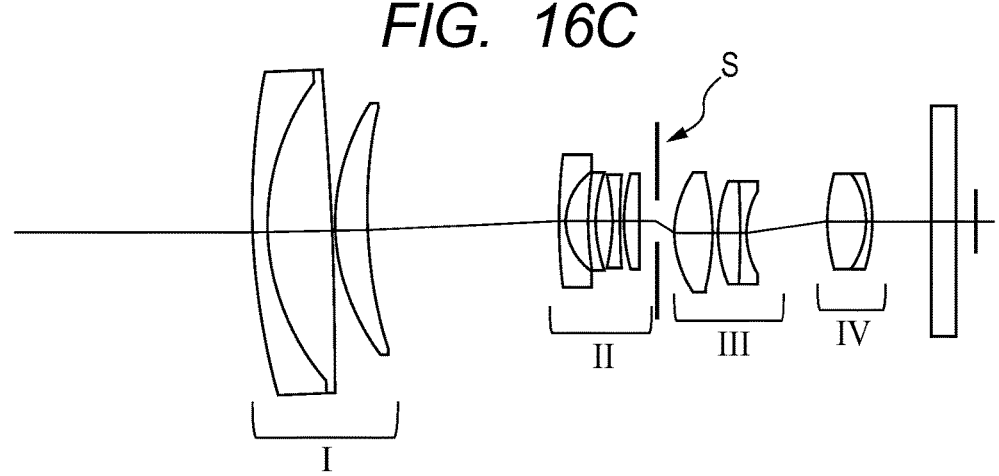
FIG. 16C is a lateral aberration diagram after vibration isolation at a telephoto end of the lens apparatus according to Embodiment 7 of the present invention.

FIGS. 16A, 16B, and 16C are cross-sectional views of a lens apparatus according to Embodiment 7 of the present invention and illustrate cross-sectional views after vibration isolation at the wide angle end (FIG. 16A), at the intermediate focal length (FIG. 16B), and at the telephoto end (FIG. 16C). The lens apparatus includes, in order from the object side, a first lens unit I having a positive refractive power, a second lens unit II having a negative refractive power, a stop (lens stop) S, a third lens unit III having a positive refractive power, and a fourth lens unit IV having a positive refractive power. In addition, the lens apparatus is a zooming optical system in which an interval between the first lens unit I and the third lens unit III is not changed while an interval between the first lens unit I and the second lens unit II, an interval between the second lens unit II and the third lens unit III, and an interval between the third lens unit III and the fourth lens unit IV are changed during zooming.

Figure 17A:
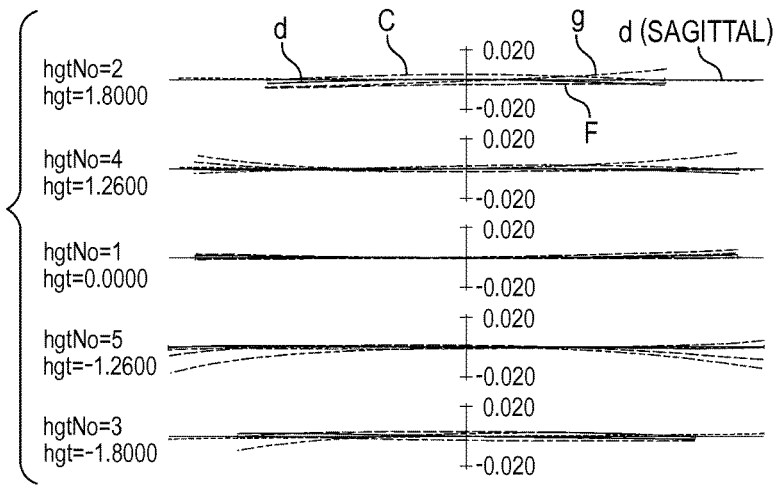
FIG. 17A is a lateral aberration diagram after vibration isolation at the wide angle end of the lens apparatus according to Embodiment 7 of the present invention.
Figure 17B:
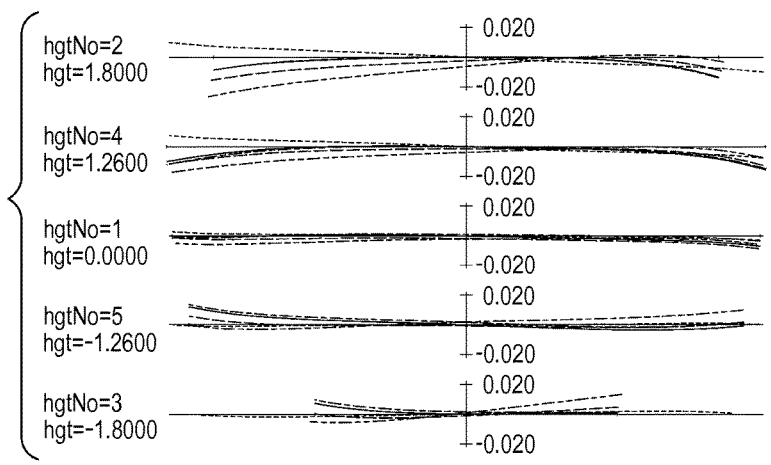
FIG. 17B is a lateral aberration diagram after vibration isolation at the intermediate focal length of the lens apparatus according to Embodiment 7 of the present invention.
Figure 17C:
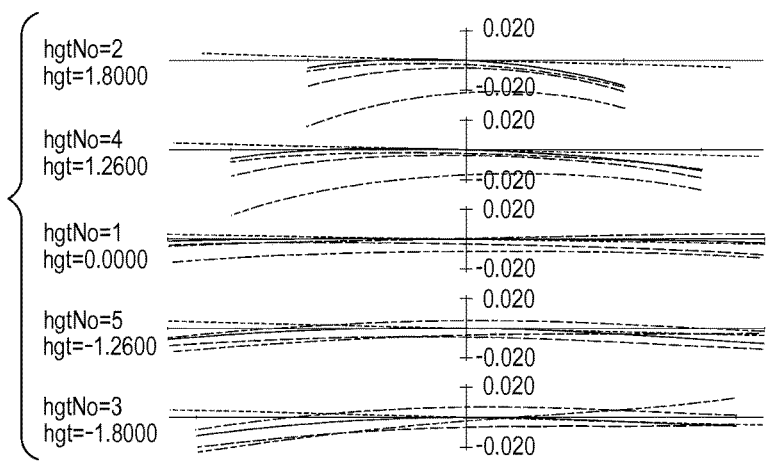
FIG. 17C is a lateral aberration diagram after vibration isolation at the telephoto end of the lens apparatus according to Embodiment 7 of the present invention.

FIGS. 17A, 17B, and 17C are lateral aberration diagrams illustrating optical performance of the lens apparatus of Embodiment 7 after vibration isolation at the wide angle end (FIG. 17A), at the intermediate focal length (FIG. 17B), and at the telephoto end (FIG. 17C).

In this embodiment, the first lens unit is configured to be rotatable about a point on the optical axis, and the second lens unit is configured to be shiftable (movable) in a direction having a component in a direction perpendicular to the optical axis. Table 7 shows the rotation center position in the optical axis direction and the rotation amount of the first lens unit and the shift amount of the second lens unit when the vibration isolation is performed so as to change the optical axis direction of Embodiment 7 by 3 degrees.

TABLE 7

Rotation center position in optical axis direction, rotation angle, and shift amount in vibration isolation of lens apparatus according to Embodiment 7 of the present invention

| | I | | II |
|---|---|---|---|
| | Rotation center position | Rotation angle | Shift amount |
| Wide angle end | 16 | 157 | −0.080 |
| Intermediate focal length | 24 | 156 | −0.043 |
| Telephoto end | 27 | 82 | −0.662 |

In Embodiment 7, as shown in Table 7, the rotation center position of the rotatable image stabilization lens unit (first lens unit) in the optical axis direction is changed by zooming, and is closer to the image side than the first unit rotational surface vertex in the entire zoom range. The rotation center position of the first lens unit in the optical axis direction in each zoom range is closest to the first unit rotational surface vertex at the wide angle end and is moved toward the image side from the wide angle end through the intermediate focal length to the telephoto end.

The exemplary embodiments of the present invention are described above, but the present invention is not limited to these embodiments and can be modified and changed variously within the scope of the gist thereof. In addition, by constituting the image pickup apparatus including the lens apparatus according to the present invention and an image sensor for receiving subject light through the lens apparatus, it is possible to realize the image pickup apparatus having a superior vibration isolation function.

Next, numerical embodiments of the present invention are shown below.

In each of the numerical embodiments, "Ri" represents a radius of curvature of an i-th surface from the object side, "Di" represents an interval between the i-th surface and the (i+1)th surface (lens thickness or air interval), and "Ni" and "vi" respectively represent a refractive index and an Abbe constant of the material of the i-th lens.

The aspherical shape is expressed in the following expression, provided that an X axis corresponds to the optical axis, an h axis corresponds to an axis perpendicular to the optical axis, a travelling direction of light corresponds to a positive direction, "R" represents a paraxial curvature radius, and each of aspherical coefficients is represented by "k", "A3", "A4", "A5", "A6", "A7", "A8", "A9", "A10", and "A11".

$$X = \frac{(1/R)h^2}{1 + \sqrt{1 - (1+k)(h/R)^2}} + A4h^4 + A6h^6 +$$

$$A8h^8 + A10h^{10} + A3h^3 + A5h^5 + A7h^7 + A9h^9 + A11h^{11}$$

Further, "e-Z" means "$10^{-Z}$".

Numerical Embodiment 1

Unit mm

Surface data

| Surface number | r | d | nd | vd |
|---|---|---|---|---|
| 1 | 53.042 | 1.35 | 1.84666 | 23.9 |
| 2 | 27.669 | 6.05 | 1.60311 | 60.6 |
| 3 | −440.883 | 0.18 | | |
| 4 | 24.923 | 3.45 | 1.69680 | 55.5 |
| 5 | 74.135 | (Variable) | | |
| 6 | 147.268 | 0.70 | 1.88300 | 40.8 |
| 7 | 7.286 | 2.97 | | |
| 8 | −111.953 | 0.60 | 1.80610 | 33.3 |
| 9 | 29.524 | 1.22 | | |
| 10 | −25.405 | 0.60 | 1.80400 | 46.6 |
| 11 | 40.497 | 0.27 | | |
| 12 | 20.279 | 1.94 | 1.92286 | 18.9 |
| 13 | −54.087 | (Variable) | | |
| 14 (Stop) | ∞ | (Variable) | | |
| 15 | 10.403 | 3.01 | 1.58313 | 59.4 |
| 16 | −129.905 | 4.39 | | |
| 17 | 56.302 | 0.60 | 1.80518 | 25.4 |
| 18 | 10.490 | 0.59 | | |
| 19* | 21.402 | 2.23 | 1.58313 | 59.4 |
| 20 | −36.074 | (Variable) | | |
| 21 | 13.772 | 3.07 | 1.69680 | 55.5 |
| 22 | −22.256 | 1.10 | 1.84666 | 23.9 |
| 23 | −236.090 | (Variable) | | |
| 24 | ∞ | 1.90 | 1.54400 | 60.0 |
| 25 | ∞ | 1.5 | | |
| Image plane | ∞ | | | |

Aspherical surface data

Fifteenth surface

K = −8.66524e−001  A4 = −1.99723e−006  A6 = 7.05266e−008
A8 = 6.79053e−010

Ninteenth surface

K = −4.10770e−001  A4 = −2.43478e−005  A6 = 1.73933e−008
A8 = −1.14367e−011

Various data
Zoom ratio 9.81

| | Wide angle | Intermediate | Telephoto |
|---|---|---|---|
| Focal length | 4.63 | 20.20 | 45.41 |
| F-number | 1.84 | 2.14 | 2.08 |
| Angle of field | 34.52 | 8.96 | 4.01 |

| Unit mm | | | |
|---|---|---|---|
| Image height | 3.19 | 3.19 | 3.19 |
| Total lens length | 79.05 | 79.05 | 79.05 |
| BF | 1.50 | 1.50 | 1.50 |
| d5 | 1.01 | 16.10 | 21.46 |
| d13 | 22.93 | 7.84 | 2.48 |
| d14 | 6.40 | 2.56 | 2.25 |
| d20 | 4.60 | 4.43 | 6.34 |
| d23 | 6.40 | 10.41 | 8.82 |

| Zoom lens unit data | | |
|---|---|---|
| Unit | First surface | Focal length |
| 1 | 1 | 36.96 |
| 2 | 6 | −7.42 |
| 3 | 14 | ∞ |
| 4 | 15 | 21.11 |
| 5 | 21 | 20.99 |
| 6 | 24 | ∞ |

Numerical Embodiment 2

| Unit mm | | | |
|---|---|---|---|
| Surface data | | | |
| Surface number | r | d | nd | vd |
| 1* | 10240.325 | 0.90 | 1.84954 | 40.1 |
| 2* | 6.228 | 2.99 | | |
| 3 | 13.714 | 1.75 | 1.92286 | 18.9 |
| 4 | 34.779 | (Variable) | | |
| 5(Stop) | ∞ | (Variable) | | |
| 6* | 7.354 | 2.50 | 1.74330 | 49.3 |
| 7* | 328.278 | 0.20 | | |
| 8 | 5.806 | 1.86 | 1.45860 | 90.2 |
| 9 | 27.018 | 1.01 | 2.00330 | 28.3 |
| 10 | 3.939 | 1.03 | | |
| 11 | 11.099 | 1.70 | 1.69350 | 53.2 |
| 12* | −30.369 | (Variable) | | |
| 13 | 19.685 | 1.70 | 1.69680 | 55.5 |
| 14 | −1559.414 | (Variable) | | |
| 15 | ∞ | 1.05 | 1.51633 | 64.1 |
| 16 | ∞ | 0.50 | | |
| Image plane | ∞ | | | |

Aspherical surface data

First surface

K = −7.54512e+008  A4 = −1.68880e−004  A6 = 3.88233e−006
A8 = −4.33771e−008  A10 = 1.82770e−010

Second surface

K = −2.03052e+000  A4 = 4.27922e−004  A6 = −4.17442e−006
A8 = 1.23794e−007  A10 = −1.62488e−009

Sixth surface

K = −4.08747e−001  A4 = −4.73185e−005  A6 = 1.46451e−006

Seventh surface

K = 4.06530e+002  A4 = 1.60052e−005  A6 = −1.50489e−007

Twelfth surface

K = 8.99077e+001  A4 = −1.37437e−004  A6 = −1.36274e−005

Various data
Zoom ratio 4.71

| | Wide angle | Intermediate | Telephoto |
|---|---|---|---|
| Focal length | 5.36 | 15.28 | 25.21 |
| F-number | 2.06 | 5.00 | 6.10 |
| Angle of field | 36.61 | 14.60 | 8.97 |
| Image height | 3.98 | 3.98 | 3.98 |
| Total lens length | 44.33 | 41.81 | 50.90 |

| Unit mm | | | |
|---|---|---|---|
| BF | 0.50 | 0.50 | 0.50 |
| d4 | 18.78 | 4.29 | 1.41 |
| d5 | 0.30 | 0.05 | −0.20 |
| d12 | 4.51 | 16.73 | 28.95 |
| d14 | 3.55 | 3.55 | 3.55 |

| Zoom lens unit data | | |
|---|---|---|
| Unit | First surface | Focal length |
| 1 | 1 | −12.51 |
| 2 | 5 | ∞ |
| 3 | 6 | 12.24 |
| 4 | 13 | 27.91 |
| 5 | 15 | ∞ |

Numerical Embodiment 3

| Unit mm | | | |
|---|---|---|---|
| Surface data | | | |
| Surface number | r | d | nd | vd |
| 1 | 47.198 | 0.90 | 1.84666 | 23.9 |
| 2 | 28.488 | 2.50 | 1.49700 | 81.5 |
| 3 | 539.547 | 0.20 | | |
| 4 | 27.858 | 1.95 | 1.69680 | 55.5 |
| 5 | 130.634 | (Variable) | | |
| 6 | −142.993 | 1.03 | 1.85135 | 40.1 |
| 7* | 5.724 | 2.27 | | |
| 8 | −32.718 | 0.60 | 1.80400 | 46.6 |
| 9 | 20.755 | 0.20 | | |
| 10 | 10.630 | 1.40 | 1.94595 | 18.0 |
| 11 | 41.156 | (Variable) | | |
| 12* | 7.790 | 1.40 | 1.58313 | 59.4 |
| 13* | −42.498 | (Variable) | | |
| 14 (Stop) | ∞ | (Variable) | | |
| 15 | 14.621 | 0.60 | 1.94595 | 18.0 |
| 16 | 7.755 | 0.51 | | |
| 17 | 38.232 | 1.45 | 1.60311 | 60.6 |
| 18 | −10.112 | (Variable) | | |
| 19 | −22.589 | 0.50 | 1.48749 | 70.2 |
| 20 | 23.874 | (Variable) | | |
| 21 | 15.072 | 2.00 | 1.69680 | 55.5 |
| 22 | −42.896 | 0.60 | 1.72825 | 28.5 |
| 23 | 240.459 | (Variable) | | |
| 24 | ∞ | 0.80 | 1.51633 | 64.1 |
| 25 | ∞ | 0.89 | | |
| Image plane | ∞ | | | |

Aspherical surface data

Seventh surface

K = −1.12918e+000  A4 = 7.09263e−004  A6 = 1.64697e−005
A8 = −3.81294e−007  A10 = 1.79401e−008

Twelfth surface

K = 1.22101e+000  A4 = 4.95648e−005  A6 = 7.55352e−006
A8 = 3.03893e−006  A10 = −1.83896e−007

Thirteenth surface

K = −1.36363e+002  A4 = 9.00236e−007  A6 = 2.00697e−005
A8 = 2.20070e−006  A10 = −1.36759e−007

Various data
Zoom ratio 13.34

| | Wide angle | Intermediate | Telephoto |
|---|---|---|---|
| Focal length | 5.12 | 17.52 | 68.32 |
| F-number | 3.21 | 4.61 | 6.08 |
| Angle of field | 33.06 | 10.77 | 2.79 |
| Image height | 3.33 | 3.33 | 3.33 |
| Total lens length | 48.61 | 56.12 | 75.70 |

-continued

| Unit mm | | | |
|---|---|---|---|
| BF | 6.94 | 13.89 | 7.22 |
| d5 | 0.95 | 11.54 | 25.33 |
| d11 | 15.79 | 4.21 | 0.71 |
| d13 | 0.92 | 0.92 | 0.92 |
| d14 | 1.48 | 1.48 | 1.48 |
| d18 | 1.90 | 2.57 | 3.04 |
| d20 | 2.51 | 3.40 | 18.89 |
| d23 | 5.52 | 12.47 | 5.80 |

| Zoom lens unit data | | |
|---|---|---|
| Unit | First surface | Focal length |
| 1 | 1 | 41.07 |
| 2 | 6 | −6.74 |
| 3 | 12 | 11.41 |
| 4 | 14 | ∞ |
| 5 | 15 | 42.99 |
| 6 | 19 | −23.73 |
| 7 | 21 | 23.41 |
| 8 | 24 | ∞ |

Numerical Embodiment 4

| Unit mm | | | | |
|---|---|---|---|---|
| Surface data | | | | |
| Surface number | r | d | nd | vd |
| 1 | 34.069 | 1.00 | 1.84666 | 23.9 |
| 2 | 19.659 | 4.00 | 1.60311 | 60.6 |
| 3 | 120.228 | 0.10 | | |
| 4 | 20.434 | 2.50 | 1.69680 | 55.5 |
| 5 | 73.395 | (Variable) | | |
| 6 | 327.566 | 0.80 | 1.84954 | 40.1 |
| 7* | 5.889 | 4.00 | | |
| 8 | −12.349 | 0.60 | 1.88300 | 40.8 |
| 9 | 45.742 | 0.10 | | |
| 10 | 22.231 | 2.10 | 1.94595 | 18.0 |
| 11 | −23.709 | (Variable) | | |
| 12 | ∞ | 8.50 | 1.83400 | 37.2 |
| 13 | ∞ | 0.80 | | |
| 14 | −16.680 | 0.60 | 1.80518 | 25.4 |
| 15 | −23.146 | (Variable) | | |
| 16* | 9.602 | 2.30 | 1.55332 | 71.7 |
| 17* | −39.481 | (Variable) | | |
| 18 | 11.792 | 0.70 | 1.84666 | 23.9 |
| 19 | 7.863 | 0.70 | | |
| 20* | 28.349 | 2.00 | 1.55332 | 71.7 |
| 21 | −7.457 | 0.60 | 1.77250 | 49.6 |
| 22 | −16.922 | (Variable) | | |
| 23 (Stop) | ∞ | (Variable) | | |
| 24 | −23.266 | 0.70 | 1.48749 | 70.2 |
| 25 | 57.733 | (Variable) | | |
| 26 | 15.839 | 2.60 | 1.48749 | 70.2 |
| 27 | −30.027 | (Variable) | | |
| 28 | ∞ | 1.00 | 1.51633 | 64.1 |
| 29 | ∞ | 0.50 | | |
| Image plane | ∞ | | | |

Aspherical surface data

Seventh surface

K = −1.71269e−001    A4 = −2.50781e−005

Sixteenth surface

K = −1.71698e+000    A4 = 9.69184e−005    A6 = −1.01040e−006
A8 = 1.76003e−008

Seventeenth surface

K = 1.79790e+001    A4 = 5.87754e−006

-continued

| Unit mm | | | |
|---|---|---|---|
| Twenty-first surface | | | |
| K = 6.18823e+000 | A4 = −7.36522e−005 | | |

| Various data | | | |
|---|---|---|---|
| Zoom ratio 9.51 | | | |
| | Wide angle | Intermediate | Telephoto |
| Focal length | 5.13 | 18.53 | 48.77 |
| F-number | 3.40 | 4.89 | 5.71 |
| Angle of field | 33.31 | 10.31 | 3.95 |
| Image height | 3.37 | 3.37 | 3.37 |
| Total lens length | 75.53 | 79.64 | 85.46 |
| BF | 9.56 | 10.13 | 6.86 |
| d5 | 0.60 | 8.38 | 15.48 |
| d11 | 6.02 | 2.35 | 1.06 |
| d15 | 13.66 | 2.80 | 0.30 |
| d17 | 1.00 | 1.00 | 1.00 |
| d18 | 1.00 | 1.00 | 1.00 |
| d23 | 0.35 | 0.35 | 0.35 |
| d24 | 1.48 | 12.34 | 14.84 |
| d26 | 7.17 | 6.60 | 9.87 |
| d28 | 8.40 | 8.97 | 5.70 |

| Zoom lens unit data | | |
|---|---|---|
| Unit | First surface | Focal length |
| 1 | 1 | 31.36 |
| 2 | 6 | −7.25 |
| 3 | 12 | −77.36 |
| 4 | 16 | 14.20 |
| 5 | 18 | ∞ |
| 6 | 19 | 275.47 |
| 7 | 24 | ∞ |
| 8 | 25 | −33.92 |
| 9 | 27 | 21.67 |
| 10 | 29 | ∞ |

Numerical Embodiment 5

| Unit mm | | | | |
|---|---|---|---|---|
| Surface data | | | | |
| Surface number | r | d | nd | vd |
| 1 | 18.275 | 0.60 | 1.92286 | 18.9 |
| 2 | 14.029 | 2.75 | 1.77250 | 49.6 |
| 3 | 94.141 | (Variable) | | |
| 4 | 247.891 | 0.50 | 1.85135 | 40.1 |
| 5* | 5.824 | 2.65 | | |
| 6 | −21.004 | 0.40 | 1.48749 | 70.2 |
| 7 | 17.123 | 0.10 | | |
| 8 | 9.825 | 1.08 | 1.95906 | 17.5 |
| 9 | 20.517 | (Variable) | | |
| 10* | 4.786 | 1.55 | 1.76802 | 49.2 |
| 11* | −40.494 | (Variable) | | |
| 12 (Stop) | ∞ | (Variable) | | |
| 13 | 6.204 | 0.45 | 1.92286 | 18.9 |
| 14 | 3.471 | (Variable) | | |
| 15* | 11.620 | 1.71 | 1.58313 | 59.4 |
| 16 | −3000.000 | (Variable) | | |
| 17 | ∞ | 0.80 | 1.51633 | 64.1 |
| Image plane | ∞ | | | |

Aspherical surface data

Fifth surface

K = 3.62105e−002    A4 = −3.21235e−005    A6 = 4.34339e−006
A8 = −1.89145e−007

-continued

Unit mm

Tenth surface

| | | |
|---|---|---|
| K = −6.68590e−001 | A4 = −1.96155e−004 | A6 = −3.71688e−005 |
| A8 = −2.24966e−006 | | |

Eleventh surface

| | | |
|---|---|---|
| K = 0.00000e+000 | A4 = 1.87374e−004 | A6 = −6.47688e−005 |

Fifteenth surface

| | | |
|---|---|---|
| K = −9.23793e−001 | A4 = 2.11181e−005 | A6 = 2.71907e−006 |
| A8 = −5.37025e−008 | | |

Various data
Zoom ratio 7.54

| | Wide angle | Intermediate | Telephoto |
|---|---|---|---|
| Focal length | 5.15 | 10.46 | 38.82 |
| F-number | 3.01 | 3.47 | 6.05 |
| Angle of field | 32.91 | 17.67 | 4.91 |
| Image height | 3.33 | 3.33 | 3.33 |
| Total lens length | 37.56 | 37.71 | 52.13 |
| BF | 1.05 | 1.05 | 1.05 |
| d3 | 0.42 | 5.41 | 12.22 |
| d9 | 13.58 | 6.06 | 0.28 |
| d11 | 0.20 | 0.20 | 0.20 |
| d12 | 0.00 | 0.00 | 0.00 |
| d14 | 6.69 | 6.88 | 22.33 |
| d16 | 3.02 | 5.52 | 3.46 |

Zoom lens unit data

| Unit | First surface | Focal length |
|---|---|---|
| 1 | 1 | 30.88 |
| 2 | 4 | −6.97 |
| 3 | 10 | 5.66 |
| 4 | 12 | ∞ |
| 5 | 13 | −9.27 |
| 6 | 15 | 19.85 |
| 7 | 17 | ∞ |

Numerical Embodiment 6

Unit mm

Surface data

| Surface number | r | d | nd | vd |
|---|---|---|---|---|
| 1* | 10240.325 | 0.90 | 1.84954 | 40.1 |
| 2* | 6.228 | 2.99 | | |
| 3 | 13.714 | 1.75 | 1.92286 | 18.9 |
| 4 | 34.779 | (Variable) | | |
| 5 (Stop) | ∞ | (Variable) | | |
| 6* | 7.354 | 2.50 | 1.74330 | 49.3 |
| 7* | 328.278 | 0.20 | | |
| 8 | 5.806 | 1.86 | 1.45860 | 90.2 |
| 9 | 27.018 | 1.01 | 2.00330 | 28.3 |
| 10 | 3.939 | 1.03 | | |
| 11 | 11.099 | 1.70 | 1.69350 | 53.2 |
| 12* | −30.369 | (Variable) | | |
| 13 | 19.685 | 1.70 | 1.69680 | 55.5 |
| 14 | −1559.414 | (Variable) | | |
| 15 | ∞ | 1.05 | 1.51633 | 64.1 |
| 16 | ∞ | 0.50 | | |
| Image plane | ∞ | | | |

Aspherical surface data

First surface

| | | |
|---|---|---|
| K = −7.54512e+008 | A4 = −1.68880e−004 | A6 = 3.88233e−006 |
| A8 = −4.33771e−008 | A10 = 1.82770e−010 | |

-continued

Unit mm

Second surface

| | | |
|---|---|---|
| K = −2.03052e+000 | A4 = 4.27922e−004 | A6 = −4.17442e−006 |
| A8 = 1.23794e−007 | A10 = −1.62488e−009 | |

Sixth surface

| | | |
|---|---|---|
| K = −4.08747e−001 | A4 = −4.73185e−005 | A6 = −1.46451e−006 |

Seventh surface

| | | |
|---|---|---|
| K = 4.06530e+002 | A4 = 1.60052e−005 | A6 = −1.50489e−007 |

Twelfth surface

| | | |
|---|---|---|
| K = 8.99077e+001 | A4 = −1.37437e−004 | A6 = −1.36274e−005 |

Various data
Zoom ratio 4.71

| | Wide angle | Intermediate | Telephoto |
|---|---|---|---|
| Focal length | 5.36 | 15.28 | 25.21 |
| F-number | 2.06 | 5.00 | 6.10 |
| Angle of field | 36.61 | 14.60 | 8.97 |
| Image height | 3.98 | 3.98 | 3.98 |
| Total lens length | 44.33 | 41.81 | 50.90 |
| BF | 0.50 | 0.50 | 0.50 |
| d4 | 18.78 | 4.29 | 1.41 |
| d5 | 0.30 | 0.05 | −0.20 |
| d12 | 4.51 | 16.73 | 28.95 |
| d14 | 3.55 | 3.55 | 3.55 |

Zoom lens unit data

| Unit | First surface | Focal length |
|---|---|---|
| 1 | 1 | −12.51 |
| 2 | 5 | ∞ |
| 3 | 6 | 12.24 |
| 4 | 13 | 27.91 |
| 5 | 15 | ∞ |

Numerical Embodiment 7

Unit mm

Surface data

| Surface number | r | d | nd | vd |
|---|---|---|---|---|
| 1 | 39.682 | 0.84 | 1.84666 | 23.9 |
| 2 | 13.496 | 3.59 | 1.69680 | 55.5 |
| 3 | −150.301 | 0.12 | | |
| 4 | 12.108 | 1.84 | 1.83481 | 42.7 |
| 5 | 29.322 | (Variable) | | |
| 6 | 29.491 | 0.42 | 1.88300 | 40.8 |
| 7 | 3.528 | 1.24 | | |
| 8 | 20.110 | 0.39 | 1.83481 | 42.7 |
| 9 | 7.700 | 0.93 | | |
| 10 | −11.509 | 0.39 | 1.77250 | 49.6 |
| 11 | 30.542 | 0.26 | | |
| 12 | 9.908 | 0.89 | 1.92286 | 18.9 |
| 13 | −99.647 | (Variable) | | |
| 14 (Stop) | ∞ | (Variable) | | |
| 15* | 5.592 | 2.10 | 1.58313 | 59.4 |
| 16* | −11.955 | 0.30 | | |
| 17 | 7.431 | 1.23 | 1.48749 | 70.2 |
| 18 | −42.954 | 0.36 | 1.80610 | 33.3 |
| 19 | 4.822 | (Variable) | | |
| 20* | 8.665 | 2.16 | 1.58313 | 59.4 |
| 21 | −4.652 | 0.36 | 1.84666 | 23.9 |
| 22 | −8.722 | (Variable) | | |
| 23 | ∞ | 1.44 | 1.51633 | 64.1 |
| 24 | ∞ | 1.07 | | |
| Image plane | ∞ | | | |

-continued

Unit mm

Aspherical surface data

Fifteenth surface

| | | |
|---|---|---|
| K = −9.27550e−001 | A5 = 9.79276e−006 | A7 = 7.68687e−007 |

Sixteenth surface

| | |
|---|---|
| K = −8.77184e+000 | A5 = 2.69465e−005 |

Twentieth surface

| | | |
|---|---|---|
| K = −1.37330e+000 | A4 = 4.29149e−005 | A6 = 2.12666e−006 |

Various data
Zoom ratio 9.75

| | Wide angle | Intermediate | Telephoto |
|---|---|---|---|
| Focal length | 3.10 | 12.92 | 30.23 |
| F-number | 1.85 | 2.68 | 4.48 |
| Angle of field | 30.14 | 7.93 | 3.41 |
| Image height | 1.80 | 1.80 | 1.80 |
| Total lens length | 39.65 | 39.65 | 39.65 |
| BF | 5.44 | 7.60 | 5.26 |
| d5 | 0.36 | 7.93 | 10.58 |
| d13 | 11.15 | 3.59 | 0.93 |
| d14 | 0.99 | 0.99 | 0.99 |
| d19 | 4.29 | 2.13 | 4.47 |
| d22 | 3.41 | 5.58 | 3.23 |
| d24 | 1.07 | 1.07 | 1.07 |

Zoom lens unit data

| Unit | First surface | Focal length |
|---|---|---|
| 1 | 1 | 17.77 |
| 2 | 6 | −3.69 |
| 3 | 14 | ∞ |
| 4 | 15 | 10.80 |
| 5 | 20 | 9.64 |
| 6 | 23 | ∞ |

TABLE 8 f1, ft, and ft/|f1| in lens apparatus
according to Embodiments 1 to 7 of the present invention

| | f1 | ft | ft/|f1| |
|---|---|---|---|
| Embodiment 1 | 37.0 | 45.4 | 1.23 |
| Embodiment 2 | −12.5 | 25.2 | 2.02 |
| Embodiment 3 | 41.1 | 68.3 | 1.66 |
| Embodiment 4 | 31.4 | 48.8 | 1.56 |
| Embndiment 5 | 30.9 | 38.8 | 1.26 |
| Embodiment 6 | −12.5 | 25.2 | 2.02 |
| Embodiment 7 | 17.8 | 30.2 | 1.70 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-284752, filed Dec. 27, 2012 which is hereby incorporated by reference herein in its entirety.

What is claimed is:

1. A lens apparatus comprising:
an optical system including multiple lens units,
wherein the optical system comprises:
a first image blur correction lens unit disposed closest to an object side in the optical system and configured to rotate during an operation of vibration isolation; and
a second image blur correction lens unit configured to move in a direction including a component in a direction perpendicular to the optical axis during the operation of vibration isolation,
wherein a rotation center position of the first image blur correction lens unit in the optical axis direction changes depending on zooming, and an interval between the first image blur correction lens unit and the rotation center position of the first image blur correction lens unit is changed during zooming, and
wherein the following conditional expression is satisfied:

$1.0 < ft/|f1| < 2.2$, where ft represents a focal length of the optical system at a telephoto end, and f1 represents a focal length of the first image blur correction lens unit.

2. A lens apparatus according to claim 1, wherein the second image blur correction lens unit is shiftable in the direction including the component in the direction perpendicular to the optical axis.

3. A lens apparatus according to claim 1, wherein the second image blur correction lens unit is adjacent to a stop.

4. A lens apparatus according to claim 1, further comprising:
a stop,
wherein the second image blur corrections comprises multiple lenses, and
wherein the stop is disposed between the multiple lenses.

5. A lens apparatus according to claim 1, wherein the first image blur correction lens unit comprises at least one positive lens and at least one negative lens.

6. An image pickup apparatus comprising:
a lens apparatus comprising:
an optical system including multiple lens units,
wherein the optical system comprises:
a first image blur correction lens unit disposed closest to an object side in the optical system and configured to rotate during an operation of vibration isolation; and
a second image blur correction lens unit configured to move in a direction including a component in a direction perpendicular to the optical axis during the operation of vibration isolation,
wherein a rotation center position of the first image blur correction lens unit in the optical axis direction is changed depending on zooming and wherein an interval between the first image blur correction lens unit and the rotation center position of the first image blur correction lens unit is changed during zooming, and
wherein the following conditional expression is satisfied:

$1.0 < ft/|f1| < 2.2$, where ft represents a focal length of the optical system at a telephoto end, and f1 represents a focal length of the first image blur correction lens unit; and
an image sensor configured to receive subject light through the lens apparatus.

* * * * *